United States Patent
Xing et al.

(10) Patent No.: US 12,503,486 B2
(45) Date of Patent: Dec. 23, 2025

(54) COMPOUND OR SALT THEREOF AND PREPARATION METHOD AND APPLICATION OF SAME

(71) Applicant: ZHEJIANG PEPTITES BIOTECH CO., LTD., Shengzhou (CN)

(72) Inventors: Haiying Xing, Shengzhou (CN); Zhiguo Liu, Beijing (CN); Xinyou Yu, Shengzhou (CN); Xiaohang Chen, Shengzhou (CN); Huiping Wang, Shengzhou (CN)

(73) Assignee: ZHEJIANG PEPTITES BIOTECH CO., LTD., Shengzhou (CN)

( * ) Notice: Subject to any disclaimer, the term of this patent is extended or adjusted under 35 U.S.C. 154(b) by 0 days.

(21) Appl. No.: 18/453,299

(22) Filed: Aug. 21, 2023

(65) Prior Publication Data

US 2024/0116980 A1   Apr. 11, 2024

Related U.S. Application Data

(63) Continuation of application No. 17/255,074, filed as application No. PCT/CN2018/092441 on Jun. 22, 2018, now abandoned.

(51) Int. Cl.
| | | |
|---|---|---|
| *C07K 1/10* | (2006.01) | |
| *C07C 217/90* | (2006.01) | |
| *C07D 307/79* | (2006.01) | |
| *C07K 1/06* | (2006.01) | |
| *C07K 7/23* | (2006.01) | |

(52) U.S. Cl.
CPC .............. *C07K 1/10* (2013.01); *C07C 217/90* (2013.01); *C07D 307/79* (2013.01); *C07K 1/063* (2013.01); *C07K 7/23* (2013.01)

(58) Field of Classification Search
CPC . C07K 1/10; C07K 1/063; C07K 7/23; C07K 1/042; C07C 217/90; C07C 271/22; C07C 39/00; C07C 271/16; C07D 307/79; C08G 69/48
See application file for complete search history.

(56) References Cited

FOREIGN PATENT DOCUMENTS

| CN | 101407540 A | 4/2009 |
| IN | 2015CHO1230 | * 9/2016 |

OTHER PUBLICATIONS

Isidro-Llobet (Chemical Reviews, 2009, 109, 2455-2504) (Year: 2009).*
Finch (J.Med.Chem., 1999, 42, 1965-1974) (Year: 1974).*
Wu (Chinese Chemical Letters, 2016, 17, 1731-1739) (Year: 2016).*
Fagundez (ACS Comb. Sci., 2018, 20, 212-219) (Year: 2018).*
First Office Action and search report issued on Jun. 1, 2023 for counterpart Chinese patent application No. 201880094905.6, along with machine EN translation downloaded from EPO, 19 pages.
Second Office Action and search report issued on Sep. 1, 2023 for counterpart Chinese patent application No. 201880094905.6, along with machine EN translation downloaded from EPO, 17 pages.
Indian Patent Application No. 1230/CHE/2015, entitled "An Improved Process for Preparing LH-RH Agonists," filed Dec. 3, 2015, 31 pages.
Indian Patent Application No. 3202/CHE/2014, entitled An Improved Process for the Preparation of Degarelix Acetate, filed Mar. 6, 2014, 30 pages.
Johnson et al., A Reversible Protecting Group for the Amide Bond in Peptides. Use in the Synthesis of 'Difficult Sequences', J. Chem. Soc., Chem. Commun., pp. 369-372, 1993, 4 pages.

* cited by examiner

*Primary Examiner* — Sudhakar Katakam

(57) ABSTRACT

The invention relates to a compound or a salt thereof, a method for preparation thereof, and use thereof, wherein the compound has the structure of Formula (1):

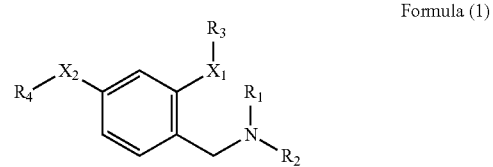

Formula (1)

the substituents in Formula (1) are as defined in the specification. The compound of Formula (1) or a salt thereof can be attached to a solid-phase resin, on which solid-phase synthesis may be performed.

1 Claim, No Drawings

COMPOUND OR SALT THEREOF AND PREPARATION METHOD AND APPLICATION OF SAME

TECHNICAL FIELD

The present invention relates to a compound or a salt thereof a method for preparation thereof, and use thereof.

BACKGROUND ART

The contents in this section only provide background information related to the present invention and does not necessarily belong to the prior art.

The inventors are aware that polypeptide drugs are of important value. For example, leuprorelin acetate, Alarelin, liraglutide, and PMX-53 (the structure of PMX-53 can be seen in EP1017713 or J. Med. Chem. 1999, 42, 1965-1974; Low-Molecular-Weight Peptidic and Cyclic Antagonists of the Receptor for the Complement Factor C5a) have important pharmaceutical uses. However, it is not easy to synthesize polypeptide drugs. The inventors are also aware that synthesis of polypeptides generally includes the solid-phase synthesis method, liquid-phase synthesis method, solid-liquid combinational synthesis method, etc., among which the solid-phase synthesis is generally the mainstream method. However, some modifications are not easy to accomplish by the solid-phase synthesis method alone, and even if they can be, the yield is not high. For example, regarding synthesis of Leuprorelin acetate, as disclosed in CN101195653B, the total yield was 16.5%, the purity was 98%, and the purity of the crude product is not mentioned. In Chen Xiaofen et al., "The Analysis and Purification of Luteinizing Hormone Releasing-Hormone by High Performance Liquid Chromatography", the purity of crude product was 53%, the purity after purification was 85% which was low, and the purification yield was 76%; and the total yield cannot be calculated. CN1015997325B disclosed that the purification yield was 71%, and the purity was greater than 98.5%, the purity and yield of crude product were not mentioned, and the total yield cannot be calculated. CN102464702B disclosed that the yield of crude product was 15% to 25%, the purification yield was 95%, the total yield was 14% to 24%, and the purity was 99.5%.

SUMMARY OF INVENTION

In one aspect, the invention relates to the compound represented by the following Formula (1) or a salt thereof:

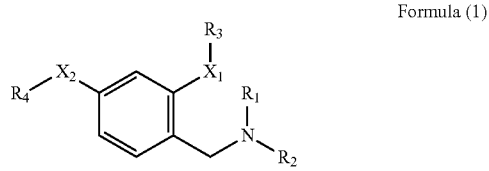

Formula (1)

in Formula (1), $R_1$ is hydrogen or an amino-protecting group;

$R_2$ is selected from a group consisting of an alkyl and an amino group, and optionally, the alkyl or amino group is further substituted with 0 to 3 substituents selected from alkyl, phenyl, carboxyl group, alkoxycarbonyl, and carbamoyl;

alternatively, when $R_2$ is an alkyl, its carbon chain may contain a double bond and/or a triple bond;

alternatively, $R_2$ may, together with the N atom $R_2$ is attached to as an amino group, form an amino acid, or an amino acid with a protecting group, or a peptide chain formed by them;

$R_3$ is H or a substituent containing an active group (reaction site) that can react with a solid-phase resin;

$X_1$ and $X_2$ are each independently O or S;

$R_4$ is H or an alkyl group.

In another aspect, the invention relates to a resin carrying the compound represented by Formula (1) or a salt thereof.

In yet another aspect, the invention relates to use of the compound represented by Formula (1) or a salt thereof, or use of a resin carrying the compound represented by Formula (1) or a salt thereof.

DETAILED DESCRIPTION

The present invention is described in detail as follows in order to provide better understanding of the invention, but is not limited thereto.

In one aspect, the invention relates to a compound represented by Formula (1) or a salt thereof:

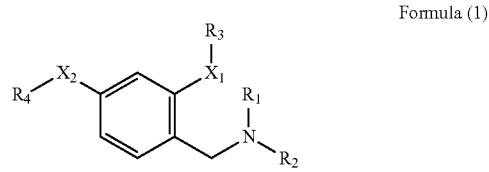

Formula (1)

In Formula (1), $R_1$ is hydrogen or an amino-protecting group; in some embodiments, the amino-protecting group includes Fmoc, Boc, Alloc, Dde, ivDde, Trt, Mtt or Mmt.

$R_2$ is selected from a group consisting of an alkyl and an amino group, and optionally, the alkyl or amino group is further substituted with 0 to 3 substituents selected from alkyl, phenyl, carboxyl group, alkoxycarbonyl, and carbamoyl; preferably, the alkyl is $C_{1-10}$ alkyl, such as $C_{1-6}$ alkyl, $C_{1-4}$ alkyl, n-butyl, isobutyl, sec-butyl, propyl, ethyl, methyl, etc.

Alternatively, when $R_2$ is an alkyl, its carbon chain may contain a double bond and/or a triple bond.

Alternatively, $R_2$ may, together with the N atom it is attached to as an amino group, form an amino acid, or an amino acid with a protecting group, or a peptide chain formed by them (that is, the N attached to $R_2$ in Formula (1) serves as the N-terminal, and $R_2$ and the N form an amino acid with or without a protecting group, or a peptide chain with or without a protecting group, such as a dipeptide, tripeptide, etc.); in some embodiments, the amino acid or amino acid with a protecting group is an α-amino acid or an α-amino acid with a protecting group.

In some embodiments, $R_2$ is $CH_3(CH_2)_n$—, $CH_2$=CH—$(CH_2)_n$—, ≡$(CH_2)_q$—, Ph-$(CH_2)_r$—, $NH_2$—C(=O)—NH—, $C_{1-6}$ alkyl-NH—,

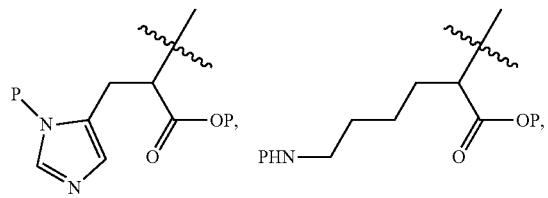

-continued

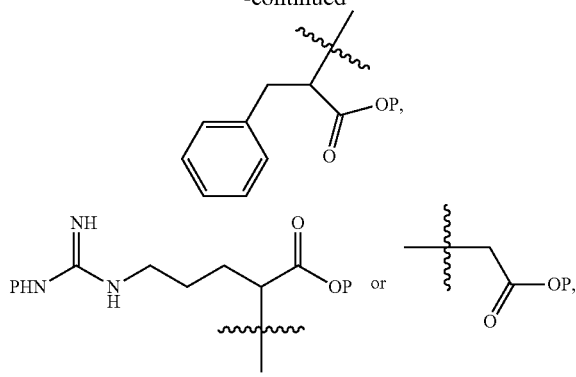

or

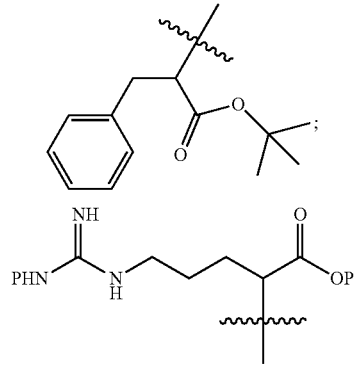

wherein P is an amino-protecting group or a hydroxyl-protecting group, and multiple Ps may be the same or different (for example,

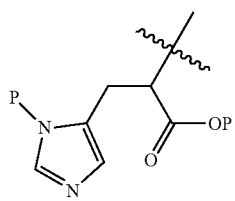

is

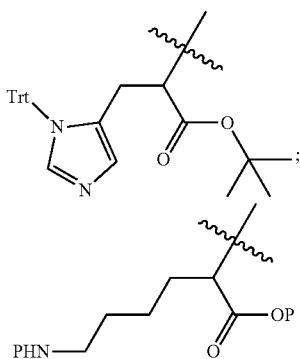

is

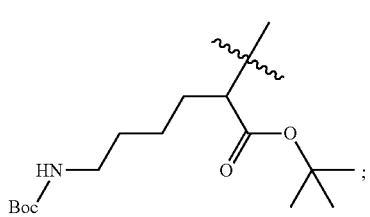

is

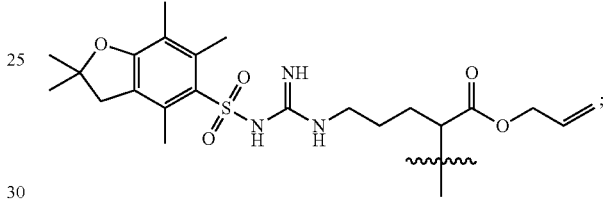

is

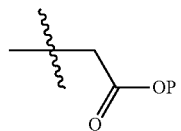

is

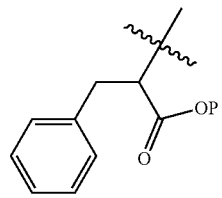

);

is wherein n, p, q, and r are each an integer of 0 to 10; any one or more $CH_2$ in the $(CH_2)_n$, $(CH_2)_p$, $(CH_2)_q$ or $(CH_2)_r$ may be substituted, for example with one or more alkyl groups, wherein the alkyl group is for example a $C_{1-3}$ alkyl, such as methyl or ethyl.

In some embodiments, $R_2$ is methyl, ethyl, propyl, n-butyl, tert-butyl, sec-butyl,

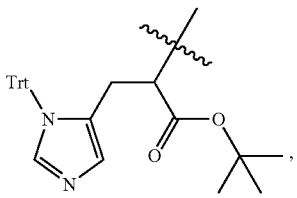

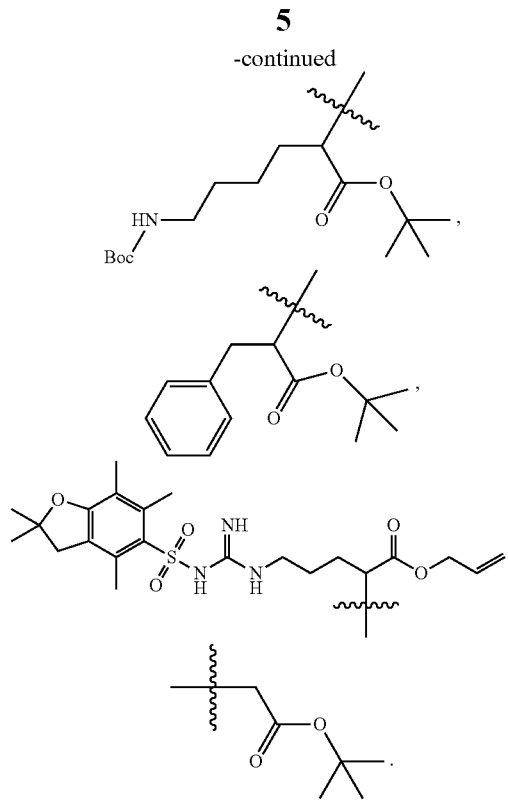

In some embodiments, R$_2$ is ethyl,

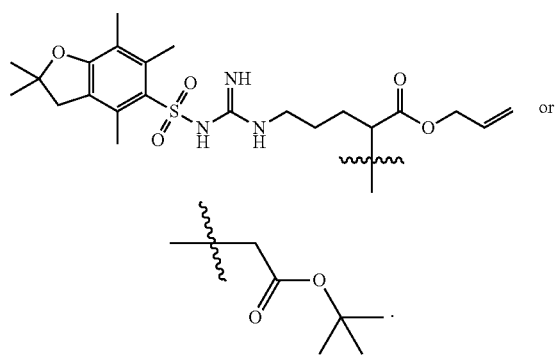

R$_3$ is H or a substituent containing an active group (reaction site) that can react with a solid-phase resin; preferably, the substituent is one containing carboxyl, hydroxyl and/or NH$_2$.

In some embodiments, R$_3$ is H or —(CH$_2$)$_m$COOH where m is an integer from 1 to 10, and any one or more CH$_2$ in the (CH$_2$)$_m$ may be substituted, for example with one or more alkyl groups; wherein the alkyl group is for example a C$_{1-3}$ alkyl, such as methyl or ethyl.

In some embodiments, R$_3$ and X$_1$ together form —OH, —O(CH$_2$)$_m$COOH, —SH or —O(CH$_2$)$_m$COOH.

X$_1$ or X$_2$ is each O or S;

In some embodiments, both X$_1$ and X$_2$ are O.

R$_4$ is H or an alkyl, preferably C$_{1-6}$ alkyl, such as C$_{1-4}$ alkyl, methyl, ethyl, n-propyl, isopropyl, etc.

The above-mentioned compound of the invention may be prepared by at least the following route:

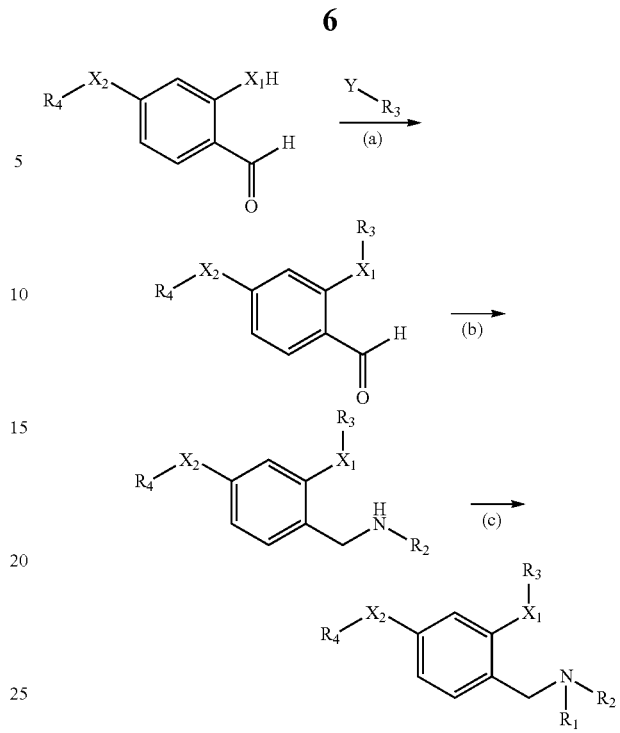

In the above route, Y is a leaving group, and the remaining substituents can be selected as defined above and will not be specified here.

In the above route, step (a) is a nucleophilic substitution reaction; step (b) is a reductive amination reaction; and step (c) is an amino protection reaction. These reactions can be performed under detailed conditions according to the conventional techniques in the art.

In each step of the above route, if a group sensitive to the reaction conditions is present, it can be protected first and then deprotected.

The above compound according to the invention can be attached to a solid-phase resin via R$_3$, which acts like a linking arm in the solid-phase synthesis of polypeptides; and then a polypeptide coupling reaction is carried out on the NH group (see the box below) of Formula (1) after deprotection, followed by a final cleavage to produce a polypeptide chain with its C-terminal being —CONHR$_2$ (if R$_2$ or a peptide chain formed by the coupling reactions contains a protecting group, it can be removed to generate a target peptide chain, and the rest part of the peptide chain may react with R$_2$ to form a cyclic peptide or the like).

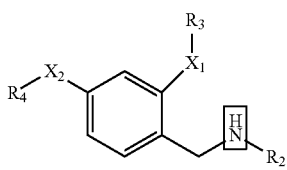

The synthesis of a polypeptide by using a solid-phase resin attaching the compound represented by Formula (1) according to the invention may simplify the synthesis of a polypeptide with a modified C-terminal, expand the scope of solid-phase cyclization, and change the use of the solid-phase resin. For example, a polypeptide with its C-terminal being carboxyl (generated from deprotection of R$_2$) may be synthesized by using AM/MBHA or a functionally equivalent resin. Furthermore, after modification of the resin, the difficulty in amino acid coupling in the synthesis of polypeptides is significantly reduced (such as in the synthesis of Liraglutide), and higher purity and yield of crude products can be obtained (such as in the synthesis of Leuprorelin and Alarelin).

Therefore, the invention provides the use of the abovementioned compound of Formula (1) attached to a solid-phase resin in the preparation of a polypeptide by reaction, wherein the C-terminal of the polypeptide contains —CONHR$_2$. In some embodiments, Formula (1) has the following structures:

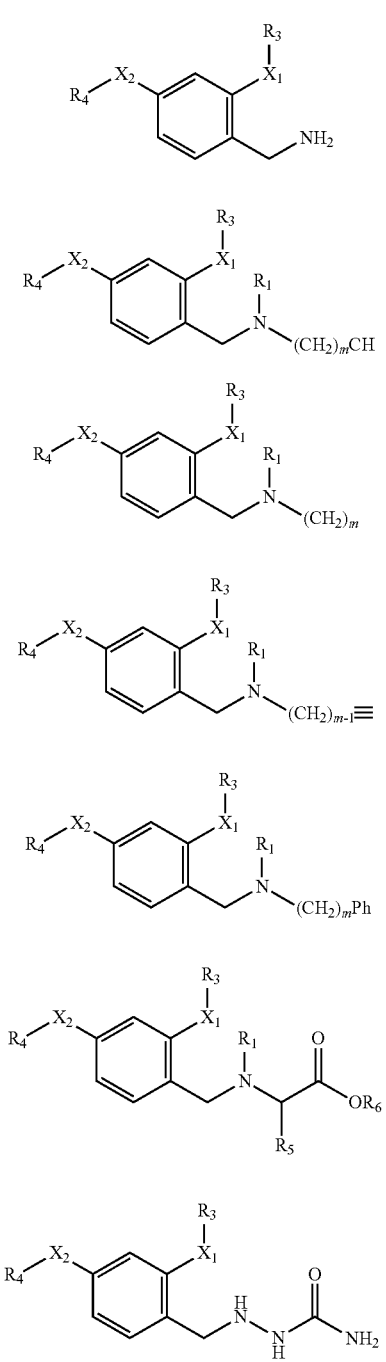

Formula (I)
Formula (II)
Formula (III)
Formula (IV)
Formula (V)
Formula (VI)
Formula (VII)

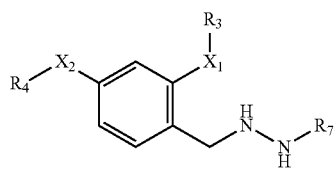

Formula (VIII)

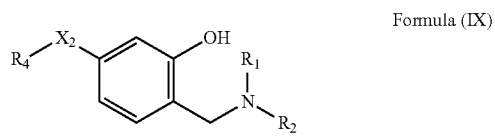

Formula (IX)

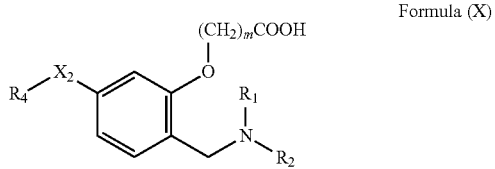

Formula (X)

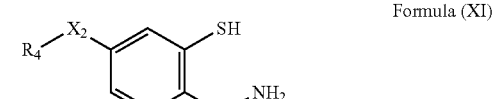

Formula (XI)

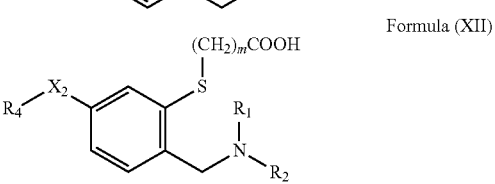

Formula (XII)

In Formula (I) to Formula (XII), $R_1$-$R_4$, $X_1$, $X_2$, n, p, q, r, s, and t are as defined above; $R_5$ is selected from —CH$_2$COOH, —CH$_2$CH$_2$COOH,

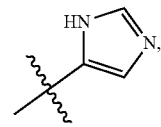 [SMILES: *c1cnc[nH]1]

—(CH$_2$)$_4$NH$_2$,

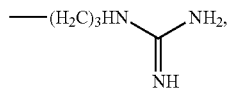

—CH$_2$OH, —CH(OH)CH$_3$, —CH$_2$CONH$_2$, —CH$_2$CH$_2$CONH$_2$, —CH$_2$SH, H, —CH$_3$, —CH(CH$_3$)$_2$, —CH$_2$CH(CH$_3$)$_2$, —CH(CH$_3$)CH$_2$CH$_3$, —(CH$_2$)$_2$SCH$_3$,

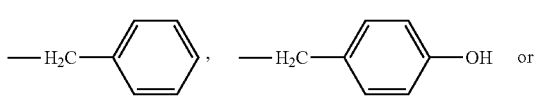

when $R_5$ contains a carboxyl, hydroxyl, —$NH_2$, —NH—, sulfydryl, or guanidine group, it may be protected by a protecting group which is for example selected from Boc, Trt, and

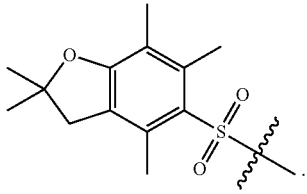 [SMILES: *S(=O)(=O)c1c(C)c(C)c2c(c1C)CC(C)(C)O2]

The carboxyl-protecting group is for example t-Bu (tert butyl), All (allyl) etc.; the hydroxyl-protecting group is for example t-Bu, TMS (trimethylsilyl) etc.; the amino-protecting group is for example Fmoc (9-fluorenylmethyloxycarbonyl), Boc (tert-butoxycarbonyl), Alloc (tert-butoxycarbonyl), Dde (1-(4,4-dimethyl-2,6-dioxocyclohexylidene)ethyl) etc; and the sulfydryl-protecting group is for example Trt (triphenylmethyl), Acm (acetylaminomethyl), etc.

$R_6$ is a carboxyl-protecting group; in some examples, $R_6$ is a $C_{1-6}$ alkyl, benzyl, Boc, etc.

$R_7$ is a $C_{1-6}$ alkyl.

In some embodiments, Formula (1) has the following structures:

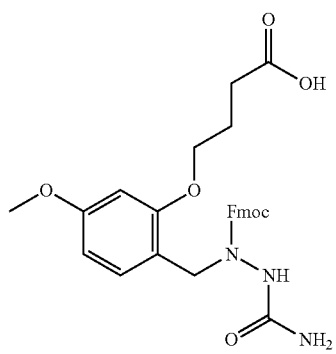

Formula (i)

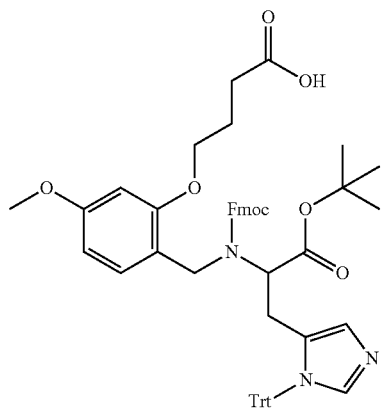

Formula (ii)

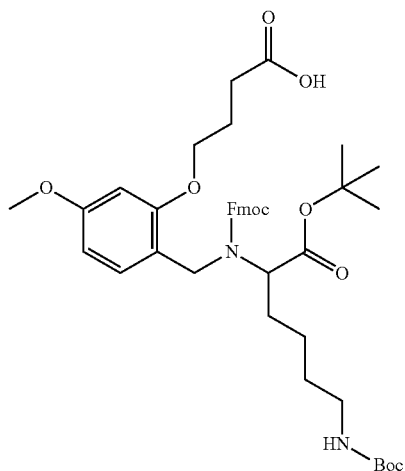

Formula (iii)

Formula (iv)

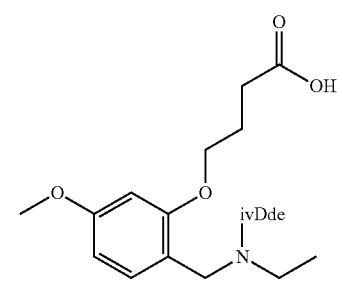

Formula (v)

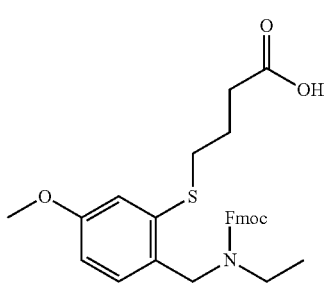

Formula (vi)

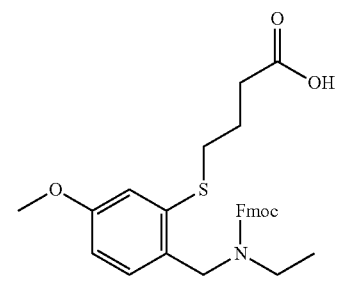
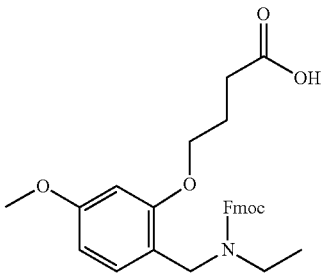
Formula (xii)
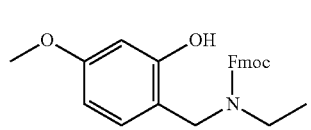
Formula (viii)
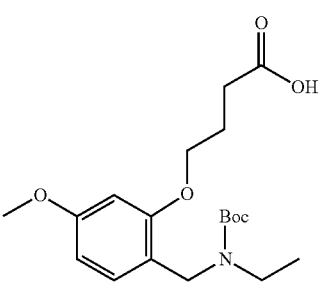
Formula (xiii)
Formula (ix)
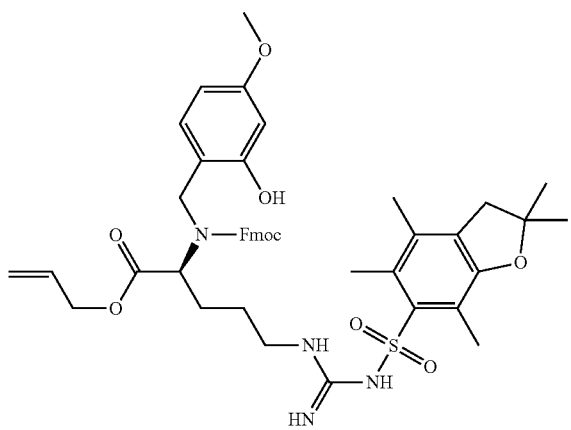
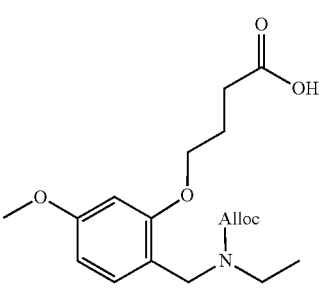
Formula (xiv)
Formula (x)
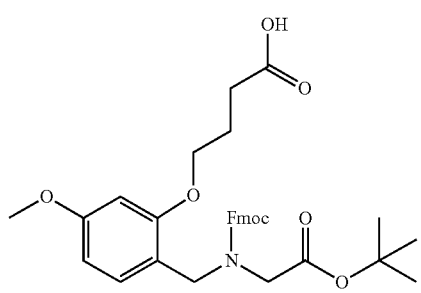
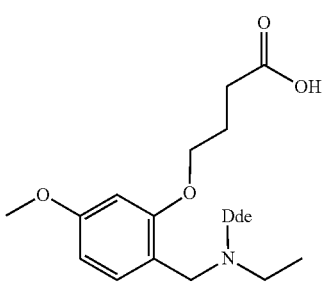
Formula (xv)
Formula (xi)
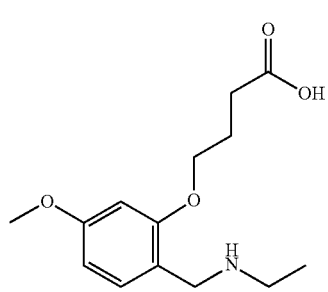
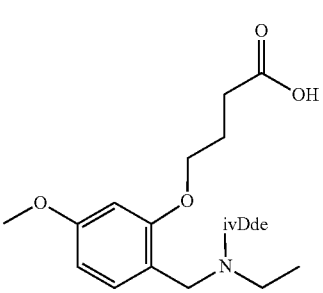
Formula (xvi)

-continued

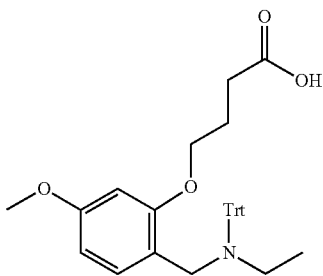

Formula (xvii)

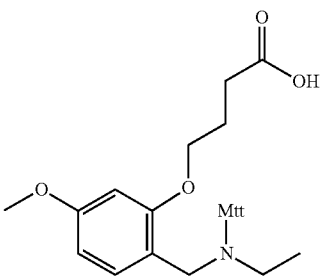

Formula (xviii)

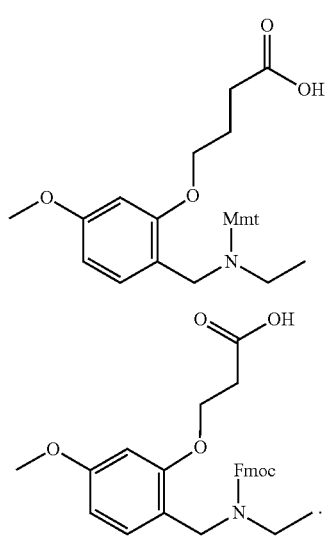

Formula (xix)

Formula (xx)

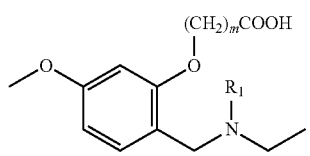

In some embodiments, Formula (X) has the following structure:

Formula (X-1)

in Formula (X-1), $R_1$ is H or an amino-protecting group; m is an integer from 1 to 10, and any one or more $CH_2$ in $(CH_2)_m$ can be substituted, with for example one or more alkyl groups which are for example $C_{1-3}$ alkyl, such as methyl or ethyl. In some embodiments, m is an integer from 2 to 6, such as 2, 3, 4, 5, or 6.

The compound of the above Formula (X-1) according to the invention can be attached to a solid-phase resin, and synthesis of a polypeptide with such a resin may help resolve the difficulty in amino acid coupling, and achieve better purity and yield of crude products (for example, in the synthesis of Leuprorelin and Alarelin). In at least some embodiments, the compound of Formula (X-1) can be attached to an AM solid-phase resin or an MBHA solid-phase resin to synthesize the polypeptide Leuprorelin with excellent purity and yield of the crude product.

In some embodiments, examples of the amino-protecting group in Formula (X-1) include but are not limited to Fmoc, Boc, Alloc, Dde, ivDde, Trt, Mtt or Mmt. That is, the compound of Formula (X-1) includes but is not limited to Formula (xi) to Formula (xx) above.

In at least one embodiment, the amino-protecting group in Formula (X-1) is Fmoc or Boc; that is, Formula (X-1) is Formula (xii) or Formula (xiii). The resulting beneficial effect is that, during the protection reaction with these two protecting groups, the raw materials are inexpensive and commercially available, the reaction conditions are simple, and post-treatment is easy. For Fmoc, the deprotection reaction is convenient and carried out under a mild condition.

In one aspect, the compound of Formula (X-1) according to the invention may be prepared by one of the following synthesis routes:

Synthesis Route 1

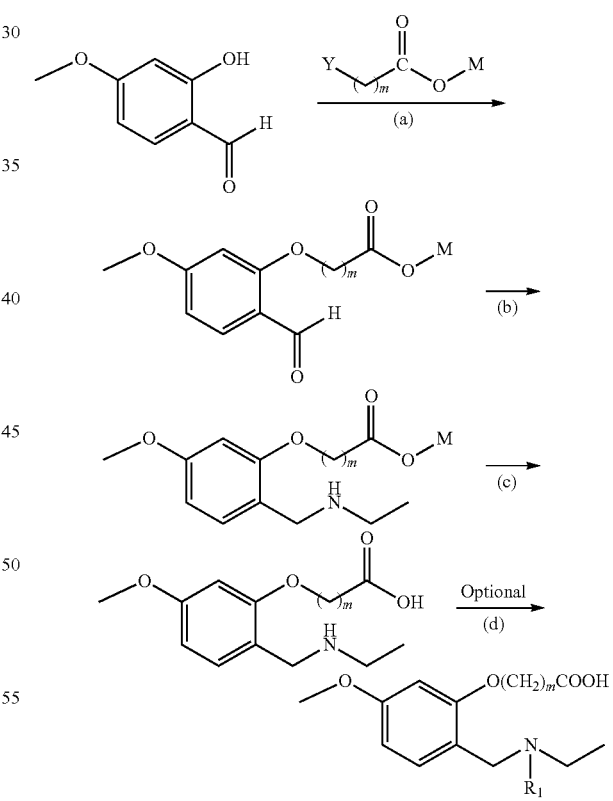

in Synthesis route 1, Y is a leaving group in a nucleophilic substitution reaction; M is H or a carboxyl-protecting group; m is as defined above, preferably 2 or 3; $R_1$ is H or an amino-protecting group which is for example Fmoc, Boc, Alloc, Dde, ivDde, Trt, Mtt or Mmt.

In some embodiments, Y is a halogen atom or a sulfonate group. In some embodiments, the halogen atom is chlorine, bromine or iodine. In some embodiments, the sulfonate is methanesulfonate, ethanesulfonate, benzenesulfonate, or p-toluenesulfonate.

In some embodiments, M is methyl, ethyl, tert-butyl, or benzyl.

In some embodiments, step (a) in Synthesis route 1 is performed under an alkaline condition.

In some embodiments, step (b) in Synthesis route 1 is a reductive amination reaction with ethylamine or a salt thereof. In some embodiments, the reductive amination reaction of step (b) is performed by using sodium borohydride, sodium cyanoborate, sodium borohydride acetate, $H_2$/palladium carbon or $H_2$/palladium hydroxide.

In some embodiments, step (c) in Synthesis route 1 is a hydrolysis reaction.

In some embodiments, when $R_1$ is an amino-protecting group, a step (d) is further performed, in which $R_1$ is used to protect the amino group. In the invention, the conventional technical means can be used to protect the amino group with $R_1$. In some embodiments, when $R_1$ is Fmoc, the hydrogen on the nitrogen atom may be substituted with Fmoc by using Fmoc-Osu or Fmoc-Cl under alkaline conditions, to obtain the compound represented by Formula (A-2).

Synthesis Route 2

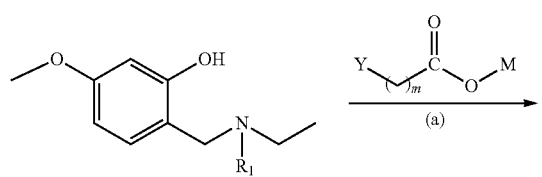

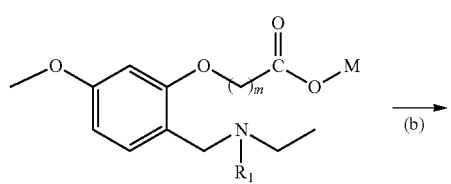

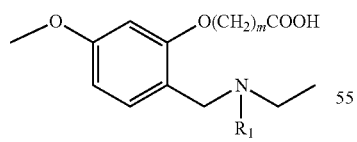

The definitions of Y, M, $R_1$, and m are the same as those in Synthesis route 1, and will not be repeated here.

In some embodiments, the reaction conditions in step (a) of Synthesis route 2 are the same as those in step (a) of Synthesis route 1.

In some embodiments, the reaction conditions in step (b) of Synthesis route 2 are the same as those in step (c) of Synthesis route 1.

Synthesis Route 3

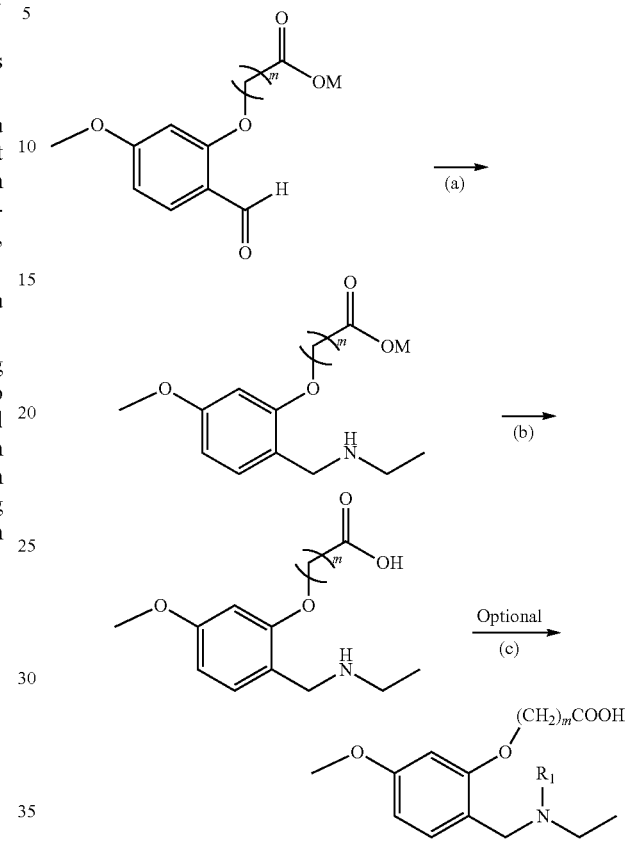

The definitions of $R_1$, M, and m are the same as those in Synthesis route 1, and will not be repeated here.

In some embodiments, the reaction conditions in step (a) of Synthesis route 3 are the same as those in step (b) of Synthesis route 1.

In some embodiments, the reaction conditions in step (b) of Synthesis route 3 are the same as those in step (c) of Synthesis route 1.

In some embodiments, the reaction conditions in step (c) of Synthesis route 3 are the same as those in step (d) of Synthesis route 1.

Synthesis Route 4

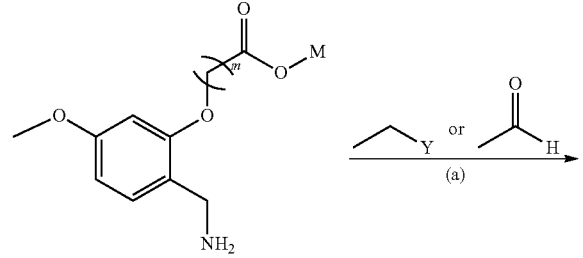

-continued

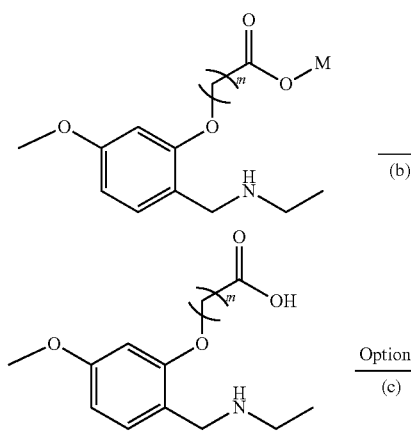

The definitions of Y, M, $R_1$, and m are the same as those in Synthesis route 1.

In some embodiments, in Synthesis route 4, step (a) involves a nucleophilic substitution reaction with

or a reductive amination reaction of

In some embodiments,

is a halogenated ethane. The conditions for the nucleophilic substitution reaction are the same as those in step (a) of Synthesis route 1. The conditions for the reductive amination reaction are the same as those in step (b) of Synthesis route 1.

In some embodiments, the reaction conditions in step (b) of Synthesis route 4 are the same as those in step (c) of Synthesis route 1.

In some embodiments, the reaction conditions in step (c) of Synthesis route 4 are the same as those in step (d) of Synthesis route 1.

In another aspect, the present invention also provides a solid-phase resin carrying the compound of Formula (1), wherein the solid-phase resin has the following structure:

Formula (1)-resin

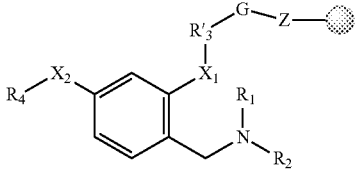

In Formula (1)-resin,

represents the body of the solid-phase resin, G is a linking structure formed by the reaction between a group in $R_3$ in above Formula (1) and a group on the side chain of the solid-phase resin, $R'_3$ is the residual structure after the reaction of $R_3$, Z is the residual structure after the reaction of the side chain of the solid-phase resin, and the definitions of the other substituents are the same as those in Formula (1); preferably, $R'_3$-G-Z is $R'_3$—CONH—Z, or $R'_3$—COO—Z (that is, the active functional group in the solid-phase resin is an amino or hydroxyl group); alternatively, Z is directly connected to $X_1$ without $R'_3$-G (that is, the active functional group on the solid-phase resin is active halogen, such as active chlorine).

In some embodiments, the resin in the Formula (1)-resin includes an AM resin, an MBHA resin, a Sieber resin, a Rink resin, a CTC resin, etc., all of which are commercially available.

The AM resin has the following structure:

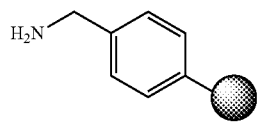

wherein $NH_2$ is usually used as the group to be connected to the $R_3$ in Formula (1), and $R_3$ may usually contain for example —COOH for the connection.

The MBHA resin has the following structure:

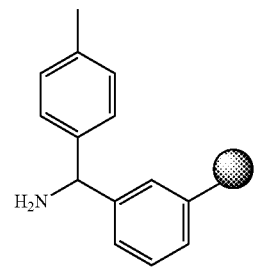

wherein, $NH_2$ is usually used as the group to be connected to the $R_3$ in Formula (1), and $R_3$ may usually contain for example —COOH for the connection.

The Sieber resin has the following structure:

[Structure of Sieber resin showing H₂N-substituted xanthene with -O-CH₂- linker to resin bead]

wherein, NH₂ is usually used as the group to be connected to the R₃ in Formula (1), and R₃ may usually contain for example —COOH for the connection.

The Rink resin has the following structure:

[Structure of Rink resin showing H₂N-CH with 2,4-dimethoxyphenyl and 4-(O-CH₂-resin)phenyl substituents]

wherein, NH₂ is usually used as the group to be connected to the R₃ in Formula (1), and R₃ may usually contain for example —COOH for the connection.

The CTC resin has the following structure:

[Structure of CTC (2-chlorotrityl chloride) resin]

wherein, the quaternary carbon attached to chlorine is usually used as the group to be connected to the R₃ in Formula (1), and R₃ may usually contain for example —OH or —NH₂ for the connection; or when R₃ is hydrogen, the quaternary carbon is directly attached to $X_1$.

In some embodiments, Formula (1)-resin has the following structures:

Formula (I)-resin

Formula (II)-resin

Formula (III)-resin

Formula (IV)-resin

Formula (V)-resin

Formula (VI)-resin

Formula (VII)-resin

Formula (VIII)-resin

-continued
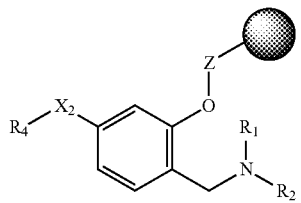
(Formula IX)-resin
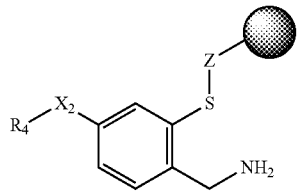
(Formula X)-resin
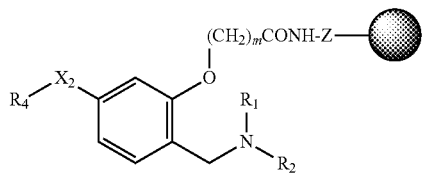
(Formula XI)-resin
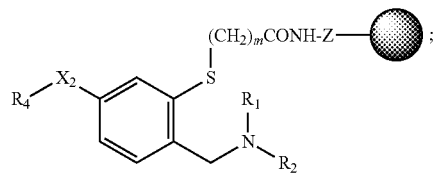
(Formula XII)-resin;
In some embodiments, Formula (1)-resin has the following structures:
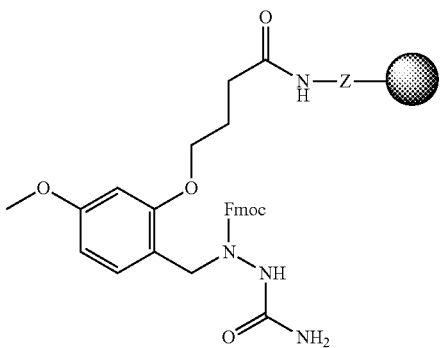
Formula (i)-resin
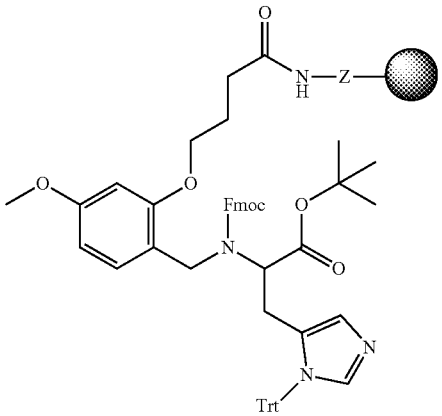
Formula (ii)-resin
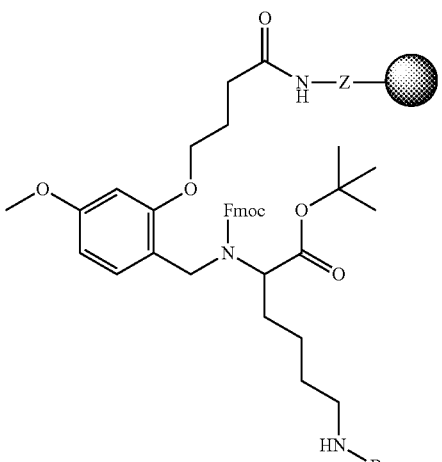
Formula (iii)-resin
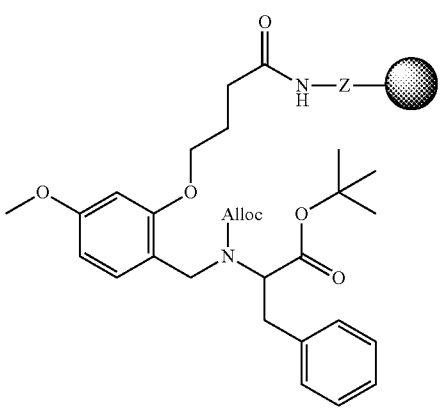
Formula (iv)-resin
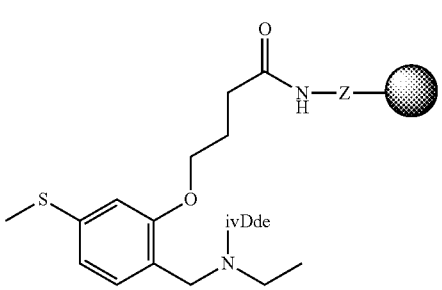
Formula (v)-resin Formula (vi)-resin
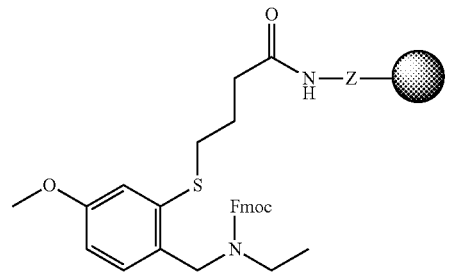
Formula (vii)-resin
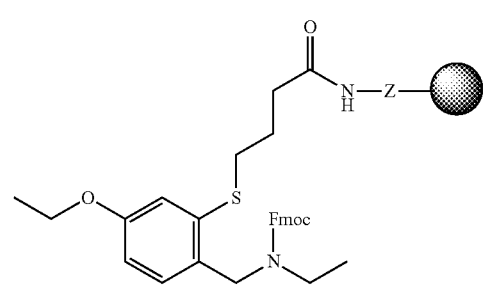
Formula (viii)-resin
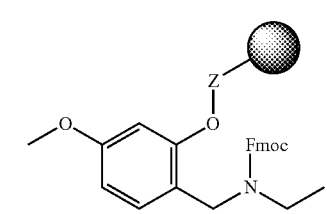
Formula (ix)-resin
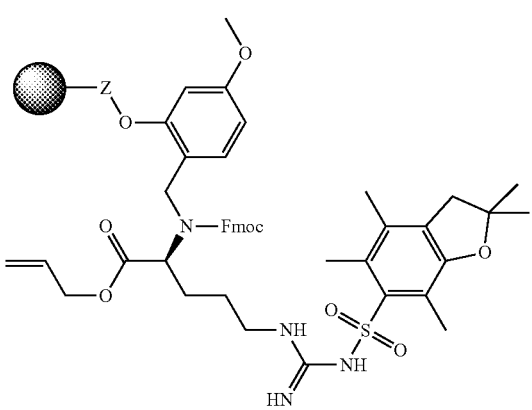
Formula (x)-resin
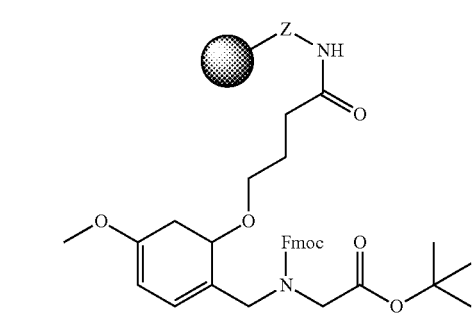
Formula (xi)-resin
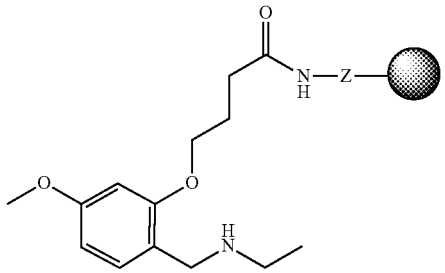
Formula (xii)-resin
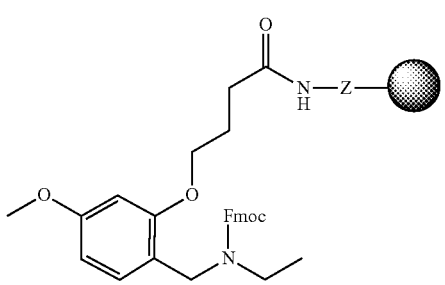
Formula (xiii)-resin
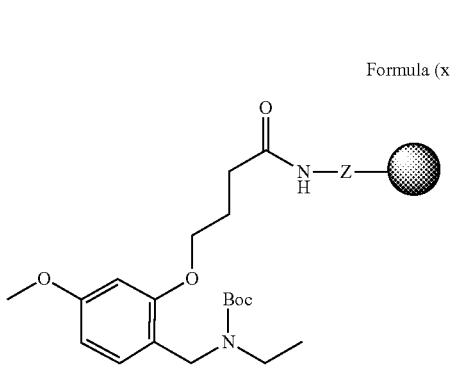
Formula (xiv)-resin
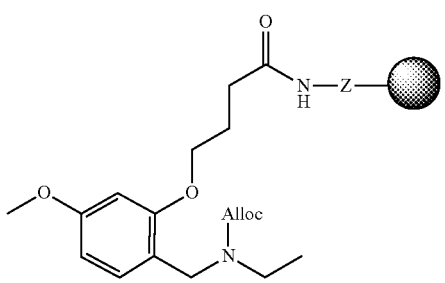
Formula (xv)-resin
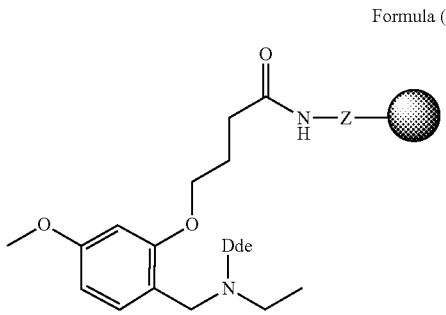

Formula (xvi)-resin

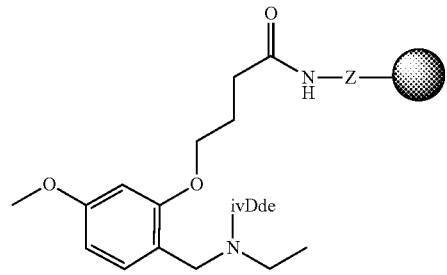

Formula (xvii)-resin

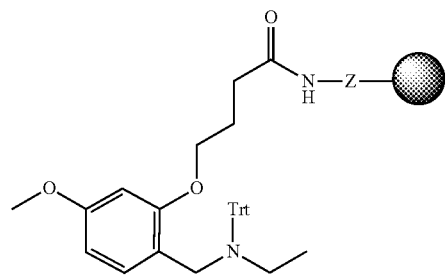

Formula (xviii)-resin

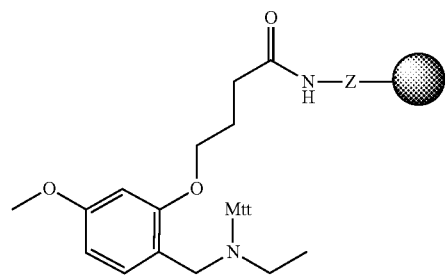

Formula (xix)-resin

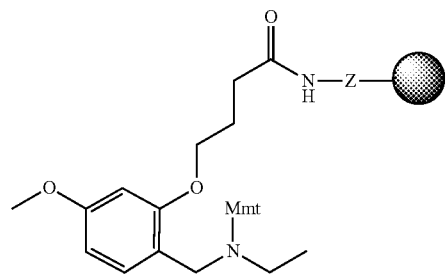

Formula (xx)-resin

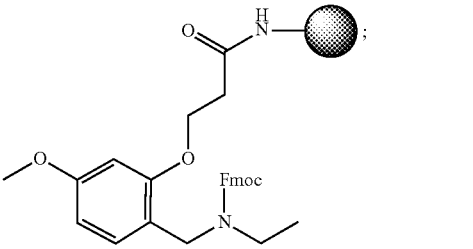

In some embodiments, the resin in Formula (i)-resin to Formula (vii)-resin and Formula (x)-resin to Formula (xx)-resin is selected from an AM resin, an MBHA resin, a Sieber resin or a Rink resin, preferably an AM resin or an MBHA resin.

In some embodiments, the resin in Formula (viii)-resin to Formula (ix)-resin is a CTC resin.

In some embodiments, Formula (X)-resin has the following structure:

Formula (X-1)-resin

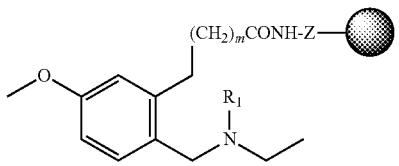

In Formula (X-1)-resin,

represents the body of the solid-phase resin, and the definitions of Z, $R_1$, and m are the same as above and will not be repeated here.

In some embodiments, the resin in Formula (X-1)-resin is an AM resin or an MBHA resin.

In the case of an AM resin, Formula (X-1)-resin can be specifically:

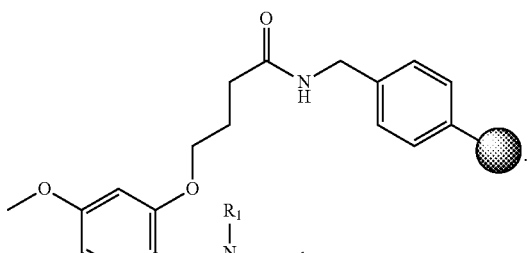

In the case of an MBHA resin, Formula (X-1)-resin can be specifically:

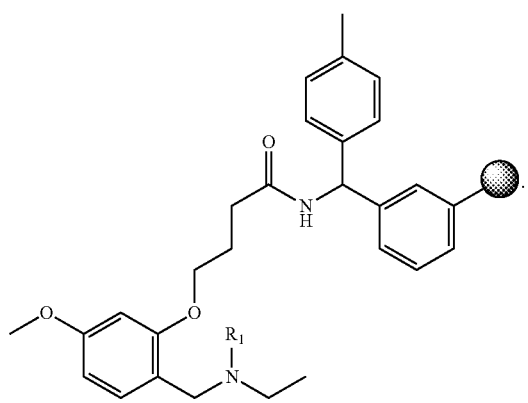

In an another aspect, the present invention provides use of the compound of Formula (1) or a salt thereof or Formula (1)-resin in the preparation of a target polypeptide or a salt thereof, wherein the C terminal of the target polypeptide contains the —$NR_2$ group from Formula (1); or alternatively, this —NR₂ group may be transformed into a target structure or form a ring with the rest of the polypeptide chain.

In some embodiments, the use comprises the following steps:

attaching the compound of Formula (1) to a starting solid-phase resin to obtain Formula (1)-resin, or directly providing Formula (1)-resin;

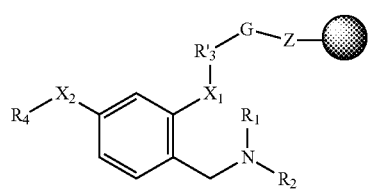

Formula (1)-resin each group in Formula (1)-resin is as defined above and will not be repeated here;

when $R_1$ is an amino-protecting group, it is removed to expose the NH group; when $R_1$ is hydrogen, there is no need to remove it;

preparing a peptide-resin with the peptide chain fully protected by stepwise solid-phase coupling on the exposed NH group;

cleaving the fully protected peptide chain off the resin to obtain, directly or after removing the protecting group(s), the target polypeptide or a salt thereof; optionally, before cleaving the fully protected peptide chain off the resin, using the fully protected peptide chain as a starting peptide to carry out cyclization to form a cyclic peptide; preferably, the reaction site of cyclization in the fully protected peptide chain is in $R_2$.

In some embodiments, the target polypeptide is Leuprorelin or a salt thereof, its C terminal being —CONHCH₂CH₃, and the NR₂ in Formula (1)-resin is NCH₂CH₃.

In some embodiments, the target polypeotide is Leuprorelin or a salt thereof, and Formula (1)-resin is Formula (X-1)-resin or Formula (IX)-resin. In some embodiments, Formula (X-1)-resin is any one of Formula (xi)-resin to Formula (xx)-resin. In some embodiments, Formula (IX)-resin is Formula (viii)-resin in which the resin is a CTC resin. In some embodiments, the resin in Formula (xi)-resin to Formula (xx)-resin is an AM resin, an MBHA resin, a Sieber resin, a Rink resin, or the like, with the first two resins preferred. The structure of Formula (X-1)-resin is as follows, where R1 is an amino-protecting group:

Formula (X-1)-AM resin

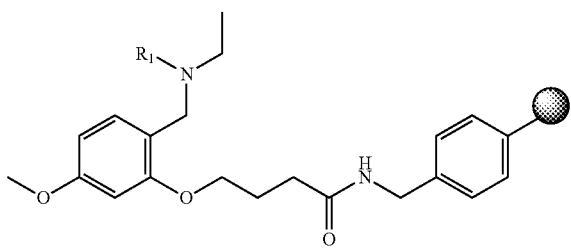

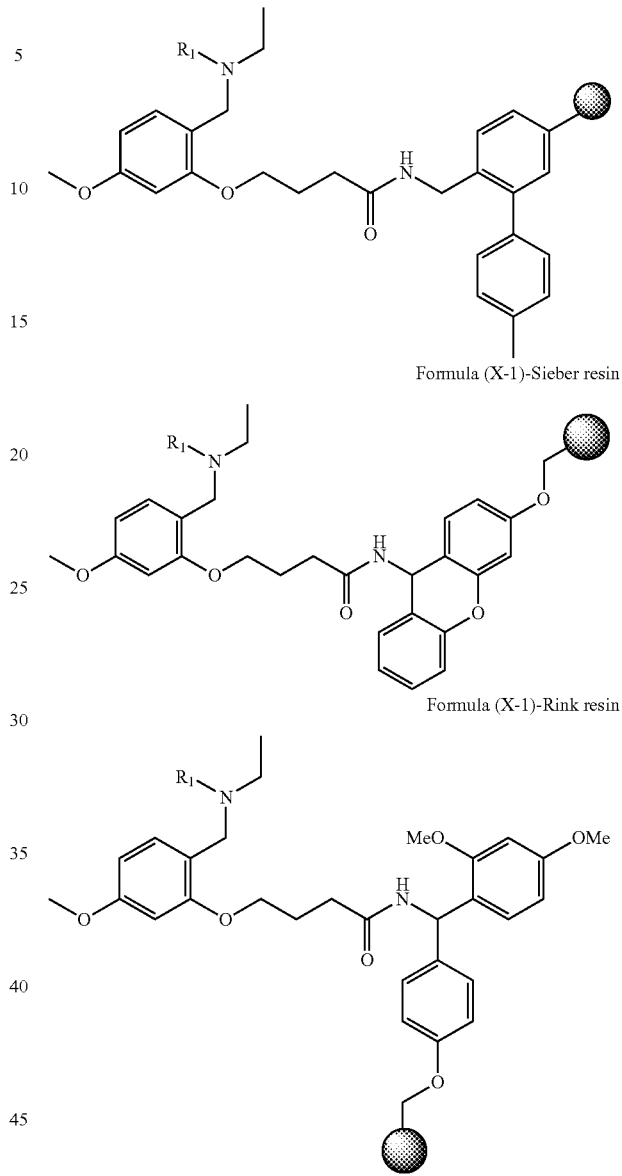

In at least some embodiments, when the target polypeptide is Leuprorelin or a salt thereof, a peptide-resin with Leuprorelin fully protected is prepared by successive solid-phase coupling of the following amino acids as reaction reagents to the exposed NH₂ group: Fmoc-Pro-OH, Fmoc-Arg(pbf)-OH, Fmoc-Leu-OH, Fmoc-DLeu-OH, Fmoc-Tyr(t-Bu)-H, Fmoc-Ser(t-Bu)-OH, Fmoc-Trp(Boc)-OH, Fmoc-His(Trt)-OH, H-Glp-OH, thereby obtaining the following fully protected Leuprorelin peptide-resin;

Glp-His(Trt)-Trp(Boc)-Ser(t-Bu)-Tyr(t-Bu)-DLeu-Leu-Arg(pbf)-Pro-Formula (1)-resin; preferably Glp-His(Trt)-Trp(Boc)-Ser(t-Bu)-Tyr(t-Bu)-DLeu-Leu-Arg(pbf)-Pro-Formula (X-1)-resin; more preferably Glp-His(Trt)-Trp(Boc)-Ser(t-Bu)-Tyr(t-Bu)-DLeu-Leu-Arg(pbf)-Pro-Formula (X-1)-AM resin, Glp-His(Trt)-Trp(Boc)-Ser(t-Bu)-Tyr(t-Bu)-DLeu-Leu-Arg(pbf)-Pro-Formula (X-1)-MBHA resin, Glp-His(Trt)-Trp(Boc)-Ser(t-Bu)-Tyr(t-Bu)-DLeu-Leu-Arg(pbf)-Pro-Formula (X-1)-Sieber resin or Glp-His (Trt)-Trp(Boc)-Ser(t-Bu)-Tyr(t-Bu)-DLeu-Leu-Arg(pbf)-Pro-Formula (X-1)-Rink resin;

wherein the Fmoc protecting group attached to the peptide on the resin is removed before each coupling step.

In some embodiments, the target polypeptide is Alarelin or a salt thereof, its carbon terminal being —CONHCH$_2$CH$_3$, and the NHR$_2$ in Formula (1)-resin is NHCH$_2$CH$_3$.

In some embodiments, the target polypeptide is Alarelin or a salt thereof, and Formula (1)-resin is Formula (X-1)-resin or Formula (IX)-resin. In some embodiments, Formula (X-1)-resin is any one of Formula (xi)-resin to Formula (xx)-resin. In some embodiments, Formula (IX)-resin is Formula (viii)-resin in which the resin is a CTC resin. In some embodiments, the resin in Formula (xi)-resin to Formula (xx)-resin is an AM resin, an MBHA resin, a Sieber resin, a Rink resin, or the like, with the first two resins preferred. The structure of Formula (X-1)-resin is as above. Formula (IX)-resin is for example:

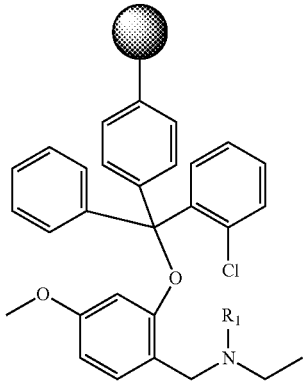

Formula (IX)-CTC resin

In Formula (IX)-resin, R$_1$ is an amino-protecting group.

In at least some embodiments, when the target polypeptide is Alarelin or a salt thereof, a peptide-resin with Alarelin fully protected is prepared by successive solid-phase coupling of the following amino acids as reaction reagents to the exposed NH$_2$ group: Fmoc-Pro-OH, Fmoc-Arg(pbf)-OH, Fmoc-Leu-OH, Fmoc-DAla-OH, Fmoc-Tyr(t-Bu)-OH, Fmoc-Ser(t-Bu)-OH, Fmoc-Trp(Boc)-OH, Fmoc-His(Trt)-OH, H-Glp-OH, thereby obtaining the following fully protected Alarelin peptide-resin:

Glp-His(Trt)-Trp(Boc)-Ser(t-Bu)-Tyr(t-Bu)-DAla-Leu-Arg(pbe-Pro-Formula (1)-resin; preferably, Glp-His(Trt)-Trp(Boc)-Ser(t-Bu)-Tyr(t-Bu)-DAla-Leu-Arg(pbe-Pro-Formula (IX)-resin; more preferably, Glp-His(Trt)-Trp(Boc)-Ser(t-Bu)-Tyr(t-Bu)-DAla-Leu-Arg(pbe-Pro-Formula (IX)-CTC resin;

wherein the Fmoc-protecting group attached to the peptide on the resin is removed before each coupling step.

In some embodiments, the target polypeptide is PMX-53 or a salt thereof, which is a cyclic peptide, and the NR$_2$ in Formula (1)-resin is

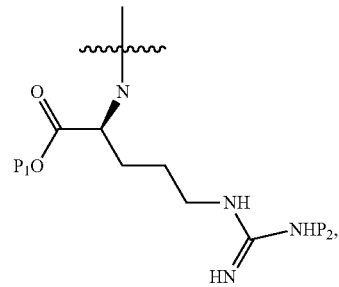

wherein P$_1$ and P$_2$ are protecting groups; and preferably, the the NR$_2$ is

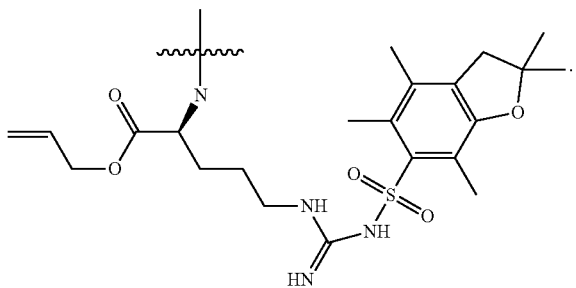 [SMILES: *N[C@@H](CCCNC(=N)NS(=O)(=O)c1c(C)c(C)c2c(c1C)OC(C)(C)C2)C(=O)OCC=C]

In some embodiments, the target polypeptide is PMX-53 or a salt thereof, and Formula (1)-resin is Formula (VI)-resin. In some embodiments, the Formula (VI)-resin is Formula (ix)-resin. Preferably, the resin in Formula (ix)-resin is a CTC resin.

In at least some embodiments, when the target polypeptide is PMX-53 or a salt thereof, a peptide-resin with the uncyclized PMX-53 fully protected is prepared by successive solid-phase coupling of the amino acids Fmoc-Trp(Boc)-OH, Fmoc-D-Cha-OH, Fmoc-Pro-OH, Fmoc-Orn(Dde)-OH, and Fmoc-Phe-OH as reaction reagents to the exposed NH$_2$ group, followed by acetylation of the amino group of the last amino acid coupled, thereby obtaining the following fully protected uncyclized PMX-53 peptide-resin:

Ac-Phe-Orn(Dde)-Pro-D-Cha-Trp(Boc)-Formula (1)-resin; preferably, Ac-Phe-Orn(Dde)-Pro-D-Cha-Trp(Boc)-Formula (VI)-resin; more preferably, Ac-Phe-Orn(Dde)-Pro-D-Cha-Trp(Boc)-Formula (ix)-resin; even more preferably, Ac-Phe-Orn(Dde)-Pro-D-Cha-Trp(Boc)-Formula (ix)-CTC resin;

wherein the Fmoc-protecting group attached to the peptide on the resin is removed before each coupling step;

then the All protecting group and the Dde protecting group are removed, followed by a cyclization reaction to obtain a fully protected PMX-53 peptide-resin Ac-Phe-c(Orn-Pro-D-Cha-Trp(Boc)-Arg(pbf))-resin, wherein the resin is preferably a CTC resin;

finally, the protecting groups are removed by cleavage to obtain the PMX-53 or a salt thereof.

In some embodiments, the target polypeptide is Liraglutide or a salt thereof, its C terminal being —CONHCH$_2$COOH, and the NR$_2$ in Formula (1)-resin is NCH$_2$COOP$_3$, in which P$_3$ is a protecting group, preferably tert-butyl.

In some embodiments, the target polypeptide is Liraglutide or a salt thereof, and Formula (1)-resin is Formula (VI)-resin. In some embodiments, the Formula (VI)-resin is Formula (x)-resin. Preferably, the resin in Formula (x)-resin is an AM resin, an MBHA resin, a Sieber resin, a Rink resin, or the like, with the first two resins preferred. Formula (VI)-resin is for example:

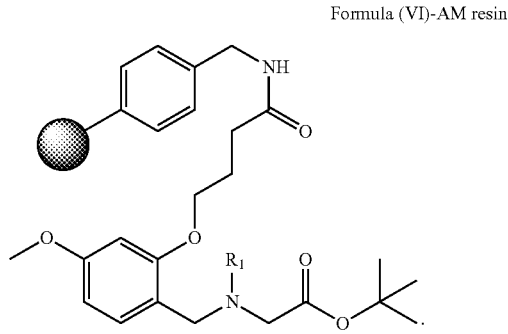

Formula (VI)-AM resin

In at least some embodiments, when the target polypeptide is Liraglutide or a salt thereof, a peptide-resin with Liraglutide fully protected is prepared by successive solid-phase coupling of the following amino acids as reaction reagents to the exposed $NH_2$ group: moc-Arg(pbf)-OH, Fmoc-Gly-OH, Fmoc-Arg(pbf)-OH, Fmoc-Val-OH, Fmoc-Leu-OH, Fmoc-Trp(Boc)-OH, Fmoc-Ala-OH, Fmoc-Ile-OH, Fmoc-Phe-OH, Fmoc-Glu(Ot-Bu)-OH, Fmoc-Lys(N-ε-(Palm-Glu-Ot-Bu)-OH, Fmoc-Ala-OH, Fmoc-Ala-OH, Fmoc-Gln(Trt)-OH, Fmoc-Gly-OH, Fmoc-Glu(Ot-Bu)-OH, Fmoc-Leu-OH, Fmoc-Tyr(t-Bu)-OH, Fmoc-Ser(t-Bu)-OH, Fmoc-Ser(t-Bu)-OH, Fmoc-Val-OH, Fmoc-Asp(Ot-Bu)-OH, Fmoc-Ser(t-Bu)-OH, Fmoc-Thr(t-Bu)-OH, Fmoc-Thr (t-Bu)-OH, Fmoc-HmbGly-OH, Fmoc-Glu(Ot-Bu)-OH, Fmoc-Ala-OH, Boc-His(Trt)-OH; thereby obtaining the following fully protected Liraglutide peptide-resin:

H-His(Trt)-Ala-Glu(Ot-Bu)-HmbGly-Thr(t-Bu)-Phe-Thr(t-Bu)-Ser(t-Bu)-Asp(Ot-Bu)-Val-Ser(t-Bu)-Ser(t-Bu)-Tyr(t-Bu)-Leu-Glu(Ot-Bu)-Gly-Gln(Tr)-Ala-Ala-Lys(N-ε-(Palm-Glu-Ot-Bu))-Glu(Ot-Bu)-Phe-Ile-Ala-Trp(Boc)-Leu-Val- Arg(pbf)-Gly-Arg(pbf)-Formula (1)-resin; preferably, H-His(Tr)-Ala-Glu(Ot-Bu)-HmbGly-Thr(t-Bu)-Phe-Thr(t-Bu)-Ser(t-Bu)-Asp(Ot-Bu)-Val-Ser(t-Bu)-Ser(t-Bu)-Tyr(t-Bu)-Leu-Glu(Ot-Bu)-Gly-Gln(Tr)-Ala-Ala-Lys(N-ε-(Palm-Glu-Ot-Bu))-Glu(Ot-Bu)-Phe-Ile-Ala-Trp(Boc)-Leu-Val-Arg(pbf)-Gly-Arg(pbf)-Formula (VI)-resin; more preferably, H-His(Tr)-Ala-Glu(Ot-Bu)-HmbGly-Thr(t-Bu)-Phe-Thr(t-Bu)-Ser(t-Bu)-Asp(Ot-Bu)-Val-Ser(t-B u)-Ser(t-Bu)-Tyr(t-Bu)-Leu-Glu(Ot-Bu)-Gly-Gln(Tr)-Ala-Ala-Lys(N-ε-(Palm-Glu-Ot-Bu))-Glu(O t-Bu)-Phe-Ile-Ala-Trp(Boc)-Leu-Val-Arg(pbf)-Gly-Arg(pbf)-Formula (x)-resin; further preferably, H-His(Tr)-Ala-Glu(Ot-Bu)-HmbGly-Thr(t-Bu)-Phe-Thr(t-Bu)-Ser(t-Bu)-Asp(Ot-Bu)-Val-Ser(t-B u)-Ser(t-Bu)-Tyr(t-Bu)-Leu-Glu(Ot-Bu)-Gly-Gln(Tr)-Ala-Ala-Lys(N-ε-(Palm-Glu-Ot-Bu))-Glu(O t-Bu)-Phe-Ile-Ala-Trp(Boc)-Leu-Val-Arg(pbf)-Gly-Arg(pbf)-Formula (x)-AM resin;

wherein the Fmoc protecting group attached to the peptide on the resin is removed before each coupling step.

In some embodiments, the starting solid-phase resin in the above reactions for synthesis of various polypeptides includes, but is not limited to, an AM resin, an MBHA resin, a Sieber resin, a Rink resin, a CTC resin or other resins having an equivalent function. The resultant Formula (1)-resin is for example Formula (1)-AM resin, Formula (1)-MBHA resin, Formula (1)-Sieber resin, Formula (1)-Rink resin or Formula (1)-CTC resin. In some embodiments, the degree of substitution of these resins ranges from 0.3 to 2.0 mmol/g.

In some embodiments, in the above reactions for synthesis of various polypeptides, the compound of Formula (1) or a salt thereof is attached to the starting solid-phase resin by using a coupling agent. In some embodiments, the coupling agent includes, but is not limited to, one or more of the combinations of DIC/HoBt, DIC/Cl-HoBt, DIC/HooBt or DIC/HoAt. In some embodiments, the molar ratio between the coupling reagent:the active reaction sites on the starting solid-phase resin:the compound of Formula (A) is 1:0.5~3.0:0.5~3.0. This method is applicable to the connection between the compound of Formula (1) and the resin via an amide group. The resin is for example an AM resin, an MBHA resin, a Sieber resin, a Rink resin or the like. For a resin similar to a CTC resin, the compound of Formula (1) is usually attached to it through a direct —O— bond, where the compound of Formula (1) may be attached to the CTC resin by a nucleophilic substitution reaction.

In some embodiments, for each coupling of the amino acids in the above reactions for synthesis of various polypeptides, the molar ratio between the active reaction sites on the resin:the amino acid to be coupled:coupling reagents is 1.0:1.5~6.0:1.5~6.0.

The number of moles of the active reaction sites on the resin according to the invention can be determined by conventional techniques, for example, the ultraviolet method.

In at least some embodiments, before each coupling of the amino acids in the above reactions for synthesis of various polypeptides, the reaction solution of the amino acid to be coupled is pre-activated at 2 to 8° C. for 5 to 15 min, and the reaction time is 30 min to 150 min. According to the invention, the pre-activation may be performed by dissolving the amino acid to be coupled together with HoBt, Cl—HoBt, HooBt, HoAt or the like, and then adding the condensation reagent DIC or the like at a low temperature. The advantage of this method lies in that the pre-activation at a low temperature helps inhibit the racemation of amino acids and may shorten the reaction time because production of an active ester by an in situ method takes time.

According to the present invention, each amino acid coupling reaction and deprotection reaction may be monitored by conventional techniques. In some embodiments, the endpoints of the amino acid coupling reaction and deprotection reaction can be determined by Ninhydrin-based detection/Tetrachlorobenzoquinone-based monitoring.

In some embodiments, the fully protected peptide is cleaved and released from the peptide-resin with an cleaving solution (the cleaving solution generally refers to a reagent that releases the peptide chain from the resin, and meanwhile may remove or not remove the protecting groups of the peptide chain; and when the protecting groups on the peptide chain cannot be removed by the cleaving solution, they can be removed by conventional methods of the invention), to obtain the target polypeptide or salt thereof. In at least one embodiment, the cleaving solution is TFA:EDT:$H_2O$ in a ratio of 90~95:2.5~5:2.5~5 (by volume). In some embodiments, the ratio of the cleaving solution to the fully protected peptide-resin is 6~15 ml cleaving solution per gram peptide-resin.

When the protecting groups need to be removed, the protecting groups according to the invention can be removed by conventional technical means in the art. In some embodiments, the Fmoc protecting group is removed with a 20% (v/v) piperidine solution in DMF (e.g. about 20 ml piperidine and 80 ml DMF per 100 ml solution) or a 2% (v/v) piperidine/2% (v/v) DBU solution in DMF (e.g. about 2 ml piperidine, about 2 ml DBU, and about 96 ml DMF per 100 ml solution), for a period of for example 5-30 min. In some embodiments, the Trt protecting group is removed with a 80% (v/v) acetic acid solution in tetrahydrofuran (e.g. about 80 ml acetic acid and about 20 ml tetrahydrofuran per 100 ml solution). In some embodiments, the ivDde protecting group is removed with a 2.5% (v/v) hydrazine hydrate solution in DMF (e.g. about 2.5 ml hydrazine hydrate and about 97.5 ml DMF per 100 ml solution). In some embodiments, the Alloc protecting group is removed with a tetra (triphenylphosphine)palladium solution in DMF. In some embodiments, the Mtt or Mmt protecting group is removed with 2% TFA solution in DCM (e.g. about 2 ml TFA and about 98 ml DCM per 100 ml solution). In some embodiments, the Boc protecting group is removed with a mixed solution of 2,6-dimethylpyridine in DCM and TBSOTf in DCM.

In some embodiments, after the fully protective peptide is released from the peptide-resin and meanwhile the protecting groups are removed to directly obtain the target polypeptide or a salt thereof, the polypeptide is further purified. The purification can be done by conventional technical means in the art. In some embodiments, the target polypeptide or a salt thereof is purified by reverse preparative liquid phase purification. In some embodiments, in the reverse preparative liquid phase, the mobile phase is an aqueous solution of 0.1% TFA and a 0.1% TFA solution in acetonitrile, and the purified product is the trifluoroacetate salt of the target polypeptide; and in order to obtain the acetate salt of the target polypeptide, in a salt exchange step the buffer system in the reverse preparative chromatography may be a 0.1~1.0% acetic acid solution in water-acetonitrile, and eventually the acetate salt of the target polypeptide is obtained by lyophilization.

The coupling reagent according to the invention refers to a reagent which can cause condensation of the carboxyl group of an amino acid and an amino group to form an amide bond.

The cleaving solution according to the present invention refers to a reagent that releases the peptide chain from the resin after synthesis of the polypeptide is complete, and meanwhile may remove or not remove the protecting groups of the peptide chain.

Some abbreviations involved in the invention have the following names, and those abbreviations not listed here may adopt the explanations in the technical field of solid phase synthesis.

| Abbrev. | Name | Abbrev. | Name |
|---|---|---|---|
| Fmoc | 9-fluorenylmethoxycarbonyl | Boc | tert-butoxycarbonyl |
| Trt | triphenylmethyl | Alloc | allyloxycarbonyl |
| Mmt | [(4-methoxyphenyl)diphenylmethyl] | OAll | allyl |
| Mtt | 4-methyltrityl | Dde | [1-(4,4-dimethyl-2,6-dioxocyclohexylidene)ethyl] |
| DIC | N,N-diisopropyl carbodiimide | DMAP | 4-N,N-dimethylpyridine |
| HoBt | 1-hydroxybenzotriazole | HooBt | 3-hydroxy-1,2,3-benzotriazin-4(3H)-one |
| HoAt | 1-hydroxy-7-azabenzotriazole | DBU | 1,5-diazabicyclo[5.4.0]undec-5-ene |
| Pro | L-proline | Arg | L-arginine |
| Leu | L-leucine | DLeu | D-leucine |
| Tyr | L-tyrosine | Ser | L-serine |
| Trp | L-tryptophan | His | L-histidine |
| Glp | L-pyroglutamic acid | Cl—HoBt | 6-chloro-1-hydroxybenzotriazole |
| 2,6-lutidine | 2,6-dimethylpyridine | TBSOTf | Tert-butyldimethylsilyl trifluoromethanesulfonate |
| (Boc)$_2$O | Di-tert-butyl dicarbonate | 2-acetyldimedone | 2-acetyl-5,5-dimethyl-1,3-cyclohexanedione |
| DMAB-OH | 2-(3-methylbutyryl)-5,5-dimethyl-1,3-cyclohexanedione | Alloc-Cl | allyl chloroformate |
| Fmoc—Cl | 9-fluorenyl methyl chloroformate | Fmoc-Osu | 9-fluorenylmethyl-N-succinimide carbonate |
| Trt-Cl | chlorotriphenylmethane | Mtt-Cl | 4-methyltriphenylchloromethane |
| Mmt-Cl | 4-methoxytritylchloromethane | EDT | 1,2-ethanedithiol |
| Tis | triisopropylsilane | DMF | N,N-dimethylformamide |
| DCM | dichloromethane | TFA | trifluoroacetic acid |
| MTBE | methyl tert-butyl ether | (Boc)$_2$O | di-tert-butyl dicarbonate |
| THF | tetrahydrofuran | SPPS | solid phase peptide synthesis |
| Cleavage | cleaving or cutting | Fmoc-Osu | 9-fluorenylmethyl-N-succinimide carbonate |
| Pd/C | Palladium on carbon | Na$_2$CO$_3$ | sodium carbonate |
| MeOH | methanol | K$_2$CO$_3$ | potassium carbonate |
| EtNH$_2$•HCl | ethylamine hydrochloride | NaBH$_3$CN | sodium cyanoborohydride |
| NaBH$_3$ | sodium borohydride | | |

In the invention, Liraglutide can be detected by the following process:

Chromatographic column octadecyl silane; mobile phase A: 13.6 g potassium dihydrogen phosphate solution (pH=3.5); mobile phase B: acetonitrile:water=1:1;

| Gradient elution: time (min) | B % |
|---|---|
| 0 | 50 |
| 25 | 50 |

-continued

| Gradient elution: time (min) | B % |
|---|---|
| 35 | 90 |
| 38 | 50 |
| 45 | 50 |

Detection wavelength: 215 nm.

In the invention, Alarelin can be detected by the following process:

Chromatographic column: octadecyl silane; mobile phase: 0.1 mmol/L phosphoric acid solution (pH is adjusted to 3.0 with triethylamine)-acetonitrile (80:20);

Running time: 90 minutes; detection wavelength: 220 nm.

In the invention, PMX-53 can be detected by the following process:

Chromatographic column: octadecyl silane; mobile phase A: 0.1% trifluoroacetic acid aqueous solution; mobile phase B: 0.1% trifluoroacetic acid/acetonitrile:water=80:20;

Gradient elution: 49~59% B 20 minutes; detection wavelength: 220 nm.

Example 1 Preparation of the Compound of Formula (XII)

The compound of Formula (xii) was prepared by the following route in this Example:

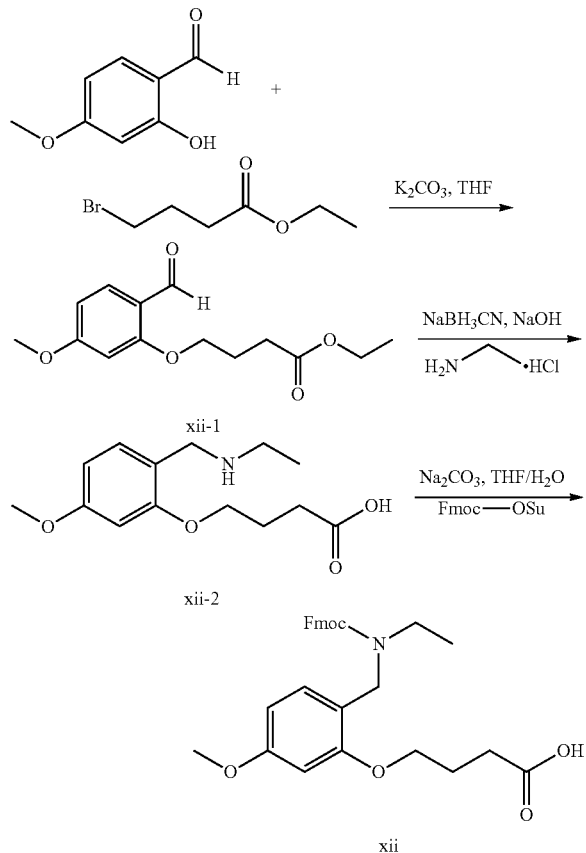

(1) Preparation of Compound xii-1

4-methoxysalicylaldehyde (100 g, 657 mmol, 1.0 eq) and $K_2CO_3$ (181 g, 1314 mmol, 2.0 eq) were weighed and put in a 1 L reaction vessel, to which THF (3.0 eq, 300 ml) and ethyl 4-bromobutyrate (192 g (141 ml), 985.5 mmol, 1.5 eq) were added, followed by stirring and heating until the reaction was complete. Then post-treatment and MTBE recrystallization followed by drying were carried out to obtain compound A-2-1, 155 g in total (yield: 88.7%, purity: 98.67%).

(2) Preparation of Compound xii-2

155 g of compound xii-1 was transferred to a 2 L reaction bottle, to which a solution of $EtNH_2 \cdot HCl$ (59.69 g, 732 mmol, 1.5 eq) and $NaBH_3CN$ (92.0 g, 1464 mmol, 3 eq) in MeOH was added, followed by stirring at room temperature for 24 hours. Then NaOH (48.8 g, 1220 mmol, 2.5 eq) was added, followed by stirring for 12 hours. The residue was extracted with MTBE once and directly used for the next step after removal of impurities.

(3) Preparation of Compound (xii)

To all of the solution obtained in above step (2), an aqueous solution of $Na_2CO_3$ (52 g, 488 mmol, 1.0 eq) in tetrahydrofuran was added, and finally Fmoc-Osu (247 g, 732 mmol, 1.5 eq) was added, followed by stirring at room temperature until completion of the reaction. Then post-treatment and MTBE recrystallization followed by drying were carried out to obtain compound (xii), 144 g in total (total yield: 44.8%, purity: 97.84% as calculated with respect to the starting material 4-methoxysalicylaldehyde).

MW=489.56 ESI, Neg: [2M-2H]-=977.4.

$^1$H-NMR (500 MHz, DMSO-$d_6$, ppm) δ: 12.10 (brs, 1H), 7.87 (m, 2H), 7.64 (d, J=6.4 Hz, 1H), 7.51 (d, J=6.5 Hz, 1H), 7.40 (d, J=6.9 Hz, 1H), 7.34 (d, J=6.9 Hz, 1H), 7.26 (d, J=6.85 Hz, 2H), 6.31-7.50 (m, 3H), 4.44 (dd, $J_1$=22.45 Hz, $J_2$=4.6 Hz, 2H), 4.15-4.25 (m, 3H), 3.96 (d, J=5.05 Hz, 2H), 3.73 (s, 3H), 3.16 (d, J=5.95 Hz, 1H), 2.93 (d, J=5.95 Hz, 1H), 2.93 (m, 2H), 1.90 (s, 2H), 0.95 (s, 1.5H), 0.72 (s, 1.5H).

Example 2 Preparation of the Compound of Formula (XII)

(1) Preparation of Compound xii-1

4-methoxysalicylaldehyde (100 g, 657 mmol, 1.0 eq) and $K_2CO_3$ (181 g, 1314 mmol, 2.0 eq) were weighed and put in a 1 L reaction vessel, to which THF (3.0 eq, 300 ml) and ethyl 4-bromobutyrate (192 g (141 ml), 985.5 mmol, 1.5 eq) were added, followed by stirring and heating until the reaction was completed. Then post-treatment and MTBE recrystallization followed by drying were carried out to obtain compound xii-1, 159.3 g in total (yield: 89.8%, purity: 98.80%).

(2) Preparation of Compound xii-2

To the above reaction vessel containing 159.3 g of compound A-2-1, an aqueous solution of NaOH (59.8 g, 1495 mmol, 2.5 eq) in methanol was added, and $EtNH_2 \cdot HCl$ (73.14 g, 897 mmol, 1.5 eq) and Pd/C (22.2 g) were finally added, followed by pressurization with $H_2$ to 0.2-20 bar and stirring at room temperature of 25° C. until the reaction was completed. After filtration, removal of Pd/C, and rotary drying of methanol, the residue was extracted with MTBE once and directly used for the next step after removal of impurities.

(3) Preparation of Compound xii

To all of the solution obtained in above step (2), an aqueous solution of Na₂CO₃ (63.4 g, 598 mmol, 1.0 eq) in tetrahydrofuran was added, and then Fmoc-Osu (302.3 g, 897 mmol, 1.5 eq) was finally added, followed by stirring at room temperature until completion of the reaction. Then post-treatment and MTBE recrystallization followed by drying were carried out to obtain compound xii, 195.2 g in total (total yield: 60.7%, purity: 96.64% as calculated with respect to the starting material 4-methoxysalicylaldehyde).

MW=489.56 ESI, Neg: [2M-2H]⁻=977.3.

¹H-NMR (500 MHz, DMSO-$d_6$, ppm) δ: 12.12 (brs, 1H), 7.84 (m, 2H), 7.63 (d, J=6.4 Hz, 1H), 7.50 (d, J=6.5 Hz, 1H), 7.41 (d, J=6.9 Hz, 1H), 7.33 (d, J=6.9 Hz, 1H), 7.26 (d, J=6.85 Hz, 2H), 6.31-7.51 (m, 3H), 4.42 (dd, $J_1$=22.45 Hz, $J_2$=4.6 Hz, 2H), 4.14-4.25 (m, 3H), 3.96 (d, J=5.05 Hz, 2H), 3.73 (s, 3H), 3.16 (d, J=5.95 Hz, 1H), 2.92 (d, J=5.95 Hz, 1H), 2.92 (m, 2H), 1.90 (s, 2H), 0.95 (s, 1.5H), 0.72 (s, 1.5H).

Example 3 Preparation of Compound of Formula xiii

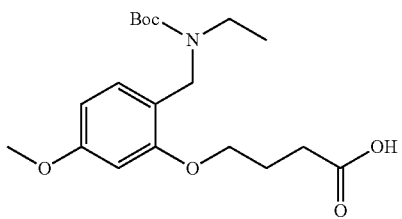

(1) 4-methoxysalicylaldehyde (100 g, 657 mmol, 1.0 eq) and K₂CO₃ (181 g, 1314 mmol, 2.0 eq) were weighed and put in a 1 L reaction vessel, to which THF (3.0 eq, 300 ml) and ethyl 4-bromobutyrate (192 g (141 ml), 985.5 mmol, 1.5 eq) were added, followed by stirring and heating until the reaction was completed. Then post-treatment and MTBE recrystallization followed by drying were carried out to obtain compound xii-1, 154.6 g in total (yield: 87.0%, purity: 98.47%).

(2) To the above reaction vessel containing 154.6 g compound xii-1, an aqueous solution of NaOH (58.1 g, 1451.5 mmol, 2.5 eq) in methanol was added, and EtNH₂·HCl (71.0 g, 870.9 mmol, 1.5 eq) and Pd/C (22.5 g) were finally added, followed by pressurization with H₂ to 0.2-20 bar and stirring at room temperature of 25° C. until the reaction was completed. After filtration, removal of Pd/C, and rotary drying of methanol, the residue was extracted with MTBE once and directly used for the next step after removal of impurities.

(3) In a 2 L reaction vessel, Na₂CO₃ (61.5 g, 580.6 mmol, 1.0 eq) was added to the solution obtained in the above step, and then H₂O and THF, and finally (Boc)₂O (139.2 g, 638.7 mmol, 1.1 eq) were added, followed by stirring and heating until the reaction was completed. Then post-treatment and purification through a normal phase silica gel column were carried out to obtain the compound of formula xiii, 107.3 g in total (total yield: 44.4%, purity: 98.72% as calculated with respect to to the starting material 4-methoxysalicylaldehyde).

MW=367.44, ESI, Neg: [2M-2H]⁻=732.7.

¹H-NMR (500 MHz, DMSO-$d_6$, ppm) δ: 12.15 (brs, 1H), 6.31-7.50 (m, 3H), 4.44 (dd, $J_1$=22.45 Hz, $J_2$=4.6 Hz, 2H), 3.96 (d, J=5.05 Hz, 2H), 3.73 (s, 3H), 3.16 (d, J=5.95 Hz, 1H), 2.93 (d, J=5.95 Hz, 1H), 2.93 (m, 2H), 1.91 (s, 2H), 0.90-0.95 (m, 12H).

According to the operation steps of Example 3, compounds of Formulae (xvii), (xviii), (xix) and (xiv) were obtained by replacing (Boc)₂O with Trt-Cl, Mtt-Cl, Mmt-Cl and Alloc-Cl, respectively, and carrying out the reaction under alkaline conditions.

According to the operation steps of Example 3, compounds of Formulae (xv) and (xvi) were obtained by replacing (Boc)₂O with 2-acetyl-5,5-dimethyl-1,3-cyclohexanedione (2-acetyldimedone) and DMAB-OH, and heating to reflux under an acid condition.

Example 4 Preparation of Compound of Formula (XX)

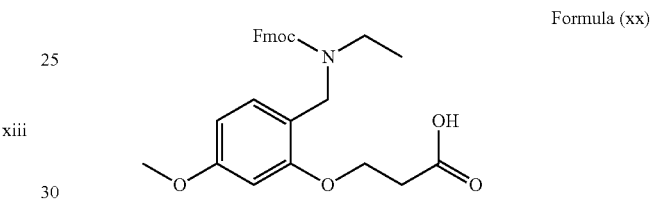

Formula (xx)

(1) 4-methoxysalicylaldehyde (100 g, 657 mmol, 1.0 eq) and K₂CO₃ (181 g, 1314 mmol, 2.0 eq) were weighed and put in a 1 L reaction vessel, to which THF (3.0 eq, 300 ml) and ethyl 3-bromopropionate (178 g (126 ml), 985.5 mmol, 1.5 eq) were added, followed by stirring and heating until the reaction was completed. Then post-treatment and MTBE recrystallization followed by drying were carried out to the following intermediate, 142.4 g (yield: 65.5%, purity: 98.67%).

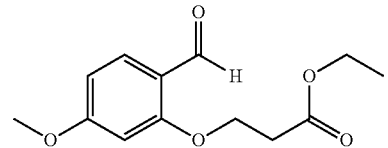 [SMILES: CCOC(=O)CCOc1cc(OC)ccc1C=O]

(2) To the above reaction vessel containing 142.4 g of the compound obtained in step (1), an aqueous solution of NaOH (56.4 g, 1411 mmol, 2.5 eq) in methanol was added, and EtNH₂·HCl (69.0 g, 846.8 mmol, 1.5 eq) and Pd/C (21.4 g) were finally added, followed by pressurization with H₂ to 0.2~20 bar and stirring at room temperature of 25° C. until the reaction was completed. After filtration, removal of Pd/C, and rotary drying of methanol, the residue was extracted with MTBE once and directly used for the next step after removal of impurities.

(3) In a 2 L reaction vessel, Na₂CO₃ (45.6 g, 564.4 mmol, 1.0 eq) was added to all of the solution obtained in the above step, and then H₂O and THF, and finally Fmoc-Osu (285.3 g, 846.6 mmol, 1.5 eq) were added, followed by stirring at room temperature of 25° C. until the reaction was completed. Then post-treatment and purification by normal phase silica gel column were carried out to obtain the following title compound xx, 158.35 g in total (yield: 50.1%, purity: 98.74% as calculated with respect to 4-methoxysalicylaldehyde).

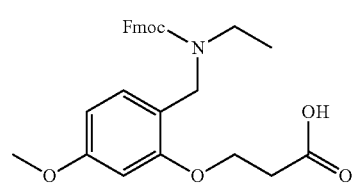

MW=475.53 ESI, Neg: [2M-2H]⁻=949.2.

$^1$H-NMR (500 MHz, DMSO-d$_6$, ppm) δ: 12.11 (brs, 1H), 7.88 (m, 2H), 7.65 (d, J=6.3 Hz, 1H), 7.52 (d, J=6.3 Hz, 1H), 7.39 (d, J=6.8 Hz, 1H), 7.33 (d, J=6.8 Hz, 1H), 7.27 (d, J=6.9 Hz, 2H), 6.30-7.50 (m, 3H), 4.45 (dd, J$_1$=21.45 Hz, J$_2$=4.5 Hz, 2H), 4.10-4.30 (m, 3H), 3.99 (d, J=5.15 Hz, 2H), 3.75 (s, 3H), 3.18 (d, J=6.05 Hz, 1H), 2.93 (d, J=6.05 Hz, 1H), 2.94 (m, 2H), 0.94 (s, 1.5H), 0.75 (s, 1.5H).

Example 5 Preparation of Compound of Formula (VIII)

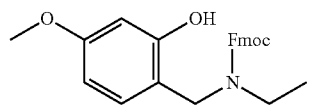

Formula (viii)

4-methoxysalicylaldehyde (100 g, 657 mmol, 1.0 eq) and EtNH$_2$·HCl (80 g, 981 mmol, 1.5 eq) were weighed and dissolved in 800 mL water to obtain a turbid solution, to which NaOH (39.36 g, 981 mmol, 1.5 eq) was added to obtain a clear solution which was stirred for 1 hour. NaBH$_3$CN (33 g, 525 mmol, 0.8 eq) was added thereto on an ice bath to allow a reaction to proceed for 3 hours. The reaction solution was poured to ethyl acetate and allowed to partition under stirring. The aqueous phase was extracted with ethyl acetate twice, and then the organic phases were combined. The organic phase was washed with saturated NaCl solution once and dried over anhydrous sodium sulfate, to obtain 126.28 g crude product for further use.

In a reaction vessel, 126.28 g of the above crude product was dissolved in a solution of H$_2$O and THF, to which Na$_2$CO$_3$ (73.77 g, 696 mmol, 1.0 eq), then H$_2$O and THF, and finally Fmoc-Osu (235 g, 696 mmol, 1.0 eq) were added, followed by stirring at room temperature until the reaction was completed. After recrystallization with ethyl acetate, the title compound of Formula (viii) was obtained, 218 g in total (total yield: 81.1%, purity: 98.64%).

MW=403.47 ESI, Neg: [2M-2H]⁻=804.8.

$^1$H-NMR (500 MHz, DMSO, ppm), δ: 9.32 (brs, 0.7H), 7.89 (m, 2H), 7.65 (d, J=6.3 Hz, 1H), 7.52 (d, J=6.3 Hz, 1H), 7.38 (d, J=6.8 Hz, 1H), 7.32 (d, J=6.8 Hz, 1H), 7.27 (d, J=6.9 Hz, 2H), 6.31-7.49 (m, 3H), 4.45 (dd, J$_1$=21.45 Hz, J$_2$=4.5 Hz, 2H), 4.10-4.30 (m, 3H), 3.99 (d, J=5.15 Hz, 2H), 3.75 (s, 3H), 0.94 (s, 1.5H), 0.75 (s, 1.5H).

Example 6 Preparation of Compound of Formula (IX)

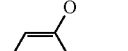

Formula (ix)

The compound was synthesized by the following route in this Example:

ix-1

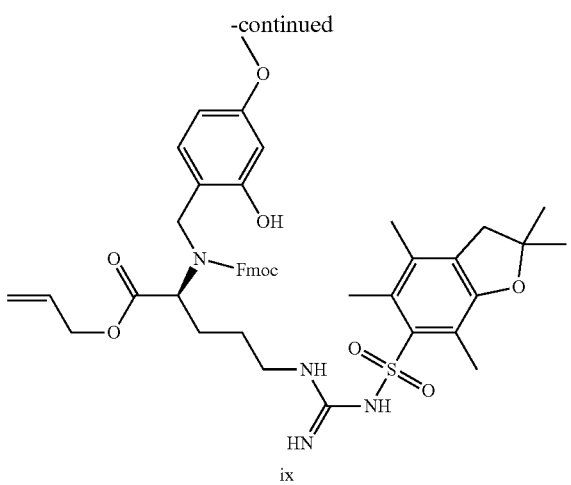

4-methoxysalicylaldehyde (100 g, 657 mmol, 1.0 eq) and H-Arg(pbf)-OAll·HCl (493 g, 981 mmol, 1.5 eq) were weighed and dissolved in 400 mL methanol to obtain a turbid solution, to which triethylamine (66.4 g, 657 mmol, 1.0 eq) was added to obtain a clear solution which was stirred for 1 hour. NaBH$_3$CN (33 g, 525 mmol, 0.8 eq) was added thereto on an ice bath to allow a reaction to proceed for 3 hours. The reaction solution was diluted with water, poured to ethyl acetate, and allowed to partition under stirring. The aqueous phase was extracted with ethyl acetate twice, and then the organic phases were combined. The organic phase was washed with saturated NaCl solution once and dried over anhydrous sodium sulfate, to obtain 126.28 g crude product for further use.

In a reaction vessel, 126.28 g of the above crude product was dissolved in a solution of H$_2$O and THF, to which Na$_2$CO$_3$ (73.77 g, 696 mmol, 1.0 eq), then H$_2$O and THF, and finally Fmoc-Osu (235 g, 696 mmol, 1.0 eq) were added, followed by stirring at room temperature of 25° C. until the reaction was completed.

After the reaction was completed as confirmed by detection, the solution was poured into a citric acid aqueous solution and allowed to partition in a separating funnel. The aqueous phase was extracted with ethyl acetate once, and then the organic phases were combined and directly vacuum-concentrated. After purification by a normal phase silica gel column, the title compound ix was obtained, 391.4 g in total (total yield: 64.5%, purity: 98.64%).

MW=911.07 ESI, Neg: [2M-2H]$^-$=1820.1.

Example 7 Preparation of Compound of Formula (x)

The compound of Formula (x) was synthesized by the following route in this Example:

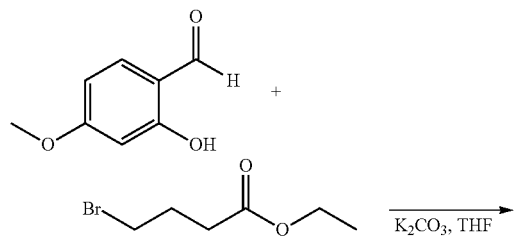

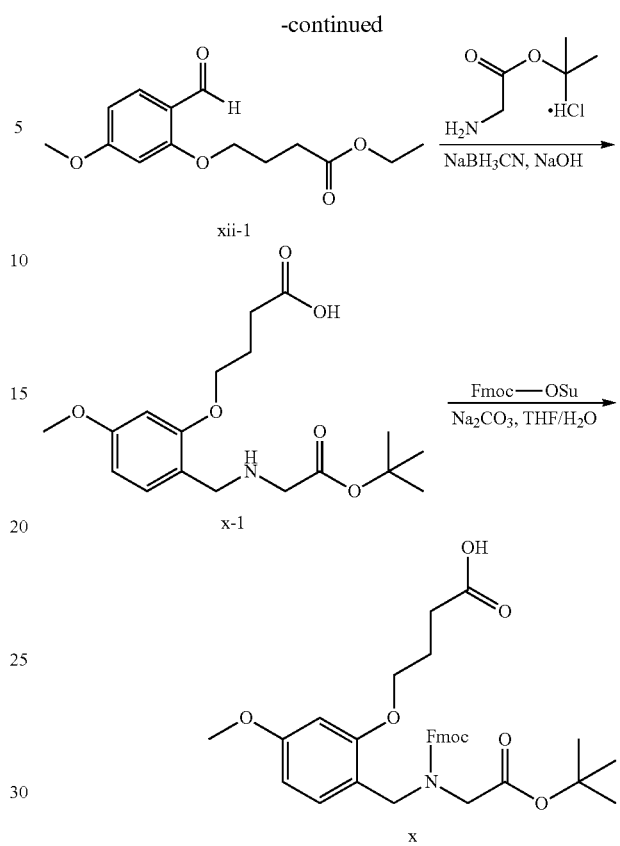

4-methoxysalicylaldehyde (10 g, 65.7 mmol, 1.0 eq) and K$_2$CO$_3$ (18.1 g, 131.4 mmol, 2.0 eq) were weighed and put in a 1 L reaction vessel, to which THF (3.0 eq, 35 ml) and ethyl 4-bromobutyrate (19.2 g, 98.6 mmol, 1.5 eq) were added, followed by stirring and heating until the reaction was completed. Then post-treatment and MTBE recrystallization followed by drying were carried out to obtain compound xii-1, 15.1 g in total (yield: 86.3%, purity: 98.74%).

In the above reaction vessel, an aqueous solution of NaOH (6.0 g, 150 mmol, 2.5 eq) in methanol was added, and H-Gly-OBu-t·HCl (15.1 g, 90 mmol, 1.5 eq) and Pd/C (3.2 g) were finally added, followed by pressurization with H$_2$ and stirring at room temperature until the reaction was completed. After filtration, removal of Pd/C, and rotary drying of methanol, the residue was extracted with MTBE once and directly used for the next step after removal of impurities.

To the above solution, an aqueous solution of Na$_2$CO$_3$ (6.0 g, 56.7 mmol, 1.0 eq) in tetrahydrofuran was added, to which Fmoc-Osu (28.73 g, 85.1 mmol, 1.5 eq) was finally added, followed by stirring at room temperature until completion of the reaction. Then post-treatment and MTBE recrystallization followed by drying were carried out to obtain the compound of Formula (x), 22.7 g in total (total yield: 58.6%, purity: 97.55%).

MW=575.65 ESI, Neg: [2M-2H]$^-$=1149.3

$^1$H-NMR (500 MHz, DMSO-d6, ppm) δ: 12.12 (brs, 1H), 7.84 (m, 2H), 7.63 (d, J=6.4 Hz, 1H), 7.50 (d, J=6.5 Hz, 1H), 7.41 (d, J=6.9 Hz, 1H), 7.33 (d, J=6.9 Hz, 1H), 7.26 (d, J=6.85 Hz, 2H), 6.31-7.51 (m, 3H), 4.55 (s, 2H), 4.42 (dd, J$_1$=22.45 Hz, J$_2$=4.6 Hz, 2H), 4.14-4.25 (m, 3H), 3.73 (s, 3H), 3.16 (d, J=5.95 Hz, 1H), 2.92 (d, J=5.95 Hz, 1H), 2.92 (m, 2H), 1.90 (s, 2H), 1.25 (s, 9H).

Example 8 Preparation of Leuprorelin Acetate

In this Example Leuprorelin was prepared from the compound of Formula (A-2) by the following route:

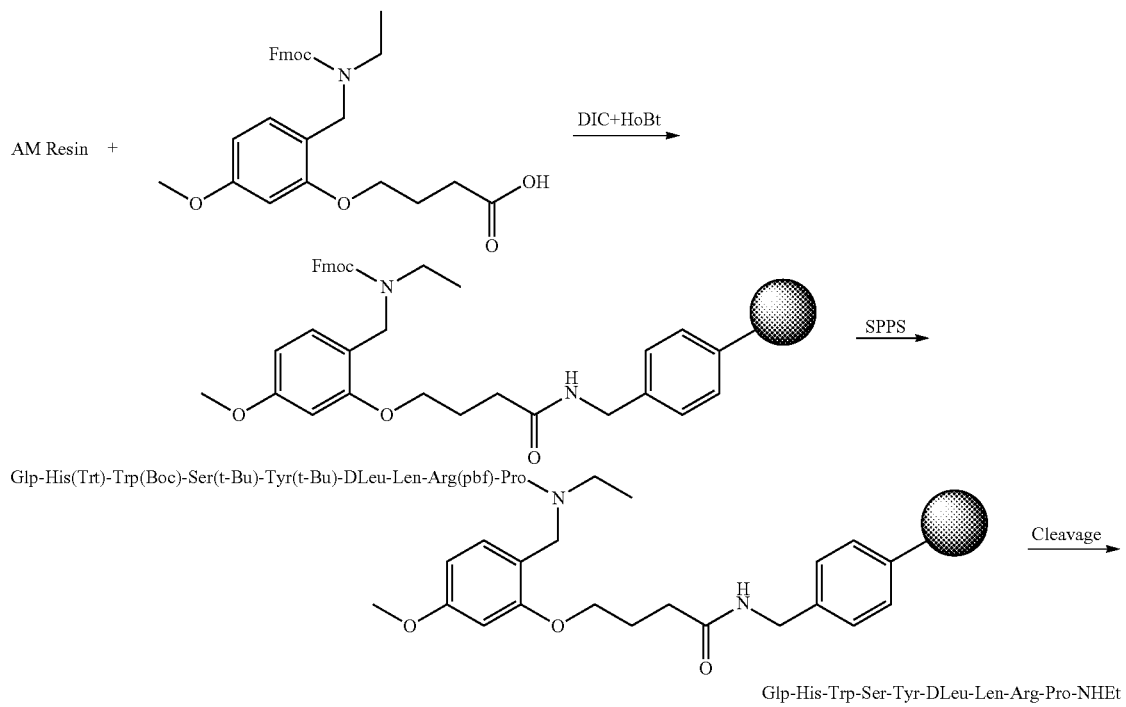

Fully protected Leuprorelin peptide-resin was prepared as follows.

AM resin (9.41 g, containing 5 mmol active reaction site —NH$_2$, with a degree of substitution of 0.53 mmol/g) was weighed and put in a jacketed glass reaction vessel, to which 100 ml DCM was added to allow swelling for 2 hours, followed by suction filtration and washing with a 5% (v/v) DIEA solution in DCM twice and with DMF twice. Then the compound of Formula (A-2) of Example 2 (4.90 g, 10 mmol) and HoBt (1.35 g, 10 mmol) were added and dissolved with an appropriate amount of DMF, then DIC (1.58 ml, 10 mmol) was added, followed by a reaction in a jacketed reactor with circulating water at 30° C. for 2.5 hours. The reaction end point was separately detected with a Ninhydrin solution and a tetrachlorobenzoquinone solution, and negative results given by both solutions indicated completion of the reaction. After completion of the reaction, the Fmoc protecting group was removed with a 20% (v/v) piperidine solution in DMF for 30 min After removal of Fmoc, the following amino acids protected by protecting groups were successively coupled by the SPPS method: Fmoc-Pro-OH, Fmoc-Arg(pbf)-OH, Fmoc-Leu-OH, Fmoc-DLeu-OH, Fmoc-Tyr(t-Bu)-OH, Fmoc-Ser(t-Bu)-OH, Fmoc-Trp(Boc)-OH, Fmoc-His(Trt)-OH, and H-Glp-OH.

Before each coupling, the Fmoc protecting group attached to the peptide on the resin was removed with a 20% (v/v) piperidine solution in DMF for 30 min.

For each coupling of an amino acid, HoBt+DIC was used as the coupling reagent, and the molar ratio of active reaction sites on the polypeptide-resin:the amino acids to be coupled:the coupling reagent was 1:3:3. Each coupling needed pre-activation of the amino acid to be coupled in an ice-water bath for about 15 minutes, that is, before connection, the coupling reagent was added to react with the amino acids to be coupled.

The fully protected Leuprorelin peptide-resin thus prepared is shown below:

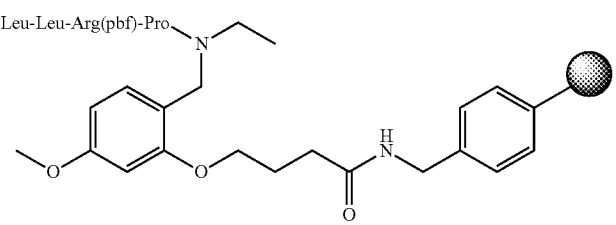

After drying, the obtained fully protected Leuprorelin peptide-resin was 21.81 g.

The crude peptide Leuprorelin trifluoroacetate was prepared as follows.

Preparation of cleaving solution: a 150 ml cleaving solution was prepared, which contained 135 ml trifluoroacetic acid, 7.5 ml EDT (1,2-ethanedithiol) and 7.5 ml pure water, and was shaken well and cooled at −20° C. for 30 min for further use.

The 21.81 g fully protected Leuprorelin peptides resin obtained above (pre-cooled at −20° C. for 30 min) was put into a 130-ml round-bottom flask equipped with a magnetic stirrer. The pre-cooled cleaving solution was shaken well and then added into the flask. The cleaving temperature was increased to 30° C. over 30 min, and maintained at 30±2° C. for 2.5 hours under stirring, followed by filtration with a sand core funnel. The resin was washed with a small amount of the cleaving solution. The combined filtrate was slowly introduced into 900 ml cold methyl tert-butyl ether (pre-cooled at −20° C. for 2 hours), during which the methyl tert-butyl ether should be stirred at a constant rate. White precipitate was formed and filtered with a Buchner funnel. The filter cake was washed with cold methyl tert-butyl ether three times, and vacuum-dried to obtain 5.87 g crude peptide Leuprorelin trifluoroacetate (yield of the crude peptide: 92.6% as calculated with respect to 5 mmol active reaction site —$NH_2$ on the starting resin; the yield of the crude peptide is calculated by dividing the actual final weight of the target product multiplied by the crude product purity by the theoretical weight of the target product (calculated based on the initial number of moles); the yields hereinafter are calculated in the same way), the purity of the crude product: 95.44%.

The crude peptide Leuprorelin trifluoroacetate was purified as follows:

The crude peptide Leuprorelin trifluoroacetate prepared above was dissolved with an aqueous solution of 5% acetonitrile, and filtered through a 0.45 μm microporous filter membrane for further use.

The reverse preparative chromatography purification was performed under the following conditions: chromatography column stationary phase: C18 octadecyl silane having a particle size of 10 μm and a pore size of 300 Å; mobile phases: 0.1% TFA aqueous solution (mobile phase A) and 0.1% TFA acetonitrile solution (mobile phase B).

| Sample solution (%) | Mobile phase A (%) | Mobile phase B (%) | Time (min) | Flow rate (ml/min) |
|---|---|---|---|---|
| 100 | 0 | 0 | / | 60 |
| 0 | 71 | 29 | 5 | 60 |
| 0 | 51 | 49 | 60 | 60 |
| 0 | 0 | 100 | 5 | 60 |

The samples with purity>97% were collected and purified with a 0.5% acetic acid aqueous solution (mobile phase C) and a 0.5% acetic acid acetonitrile solution (mobile phase D) in the following gradient:

| Sample solution (%) | Mobile phase C (%) | Mobile phase D (%) | Time (min) | Flow rate (ml/min) |
|---|---|---|---|---|
| 100 | 0 | 0 | / | 60 |
| 0 | 83 | 17 | 5 | 60 |
| 0 | 53 | 47 | 60 | 60 |
| 0 | 0 | 100 | 5 | 60 |

According to this scheme, a solution of Leuprorelin acetate in acetonitrile/water was obtained, and then subjected to rotary evaporation and lyophilization to give 2.46 g Leuprorelin acetate as a final product (total yield: 40.6% as calculated with respect to 5 mmol active reaction site —$NH_2$ on the starting resin; after assay according to EP8.0 (European Pharmacopoeia 8.0), the purity was 99.81% and any individual impurity was less than 0.15%), MW: 1209.4, ESI-MS, Pos [M+H]$^+$=1210.5.

As mentioned above, regarding the synthesis of Leubenorelin acetate, CN101195653B disclosed a total yield of 16.5% and purity of 98%, without mentioning the purity of the crude product. In Chen Xiaofen et al. "The Analysis and Purification of Luteinizing Hormone Releasing-Hormone by High Performance Liquid Chromatography", the purity of crude product was 53%, the purity after purification was 85%, and the purification yield was 76%; the purity after purification was low and the total yield cannot be calculated. CN1015997325B disclosed that the purification yield was 71%, and the purity was greater than 98.5%, the purity and yield of crude product were not mentioned, and the total yield cannot be calculated. CN102464702B disclosed that the yield of crude product was 15% to 25%, the purification yield was 95%, the total yield was 14% to 24%, and the purity was 99.5%. In the present invention, Leuprorelin acetate was tested with the TFA system (mobile phase: A: 0.1% TFA/$H_2O$; B: 0.1% TFA/acetonitrile; the gradient is from 25% A+75% B to 35% A+65% B over 20 min; flow rate: 1 ml/min), and the purification yield was 65%, the purity of the crude product was 99.3% and the most individual impurity was 0.27%.

Example 9 Preparation of Leuprorelin Acetate

Fully protected Leuprorelin peptide-resin was prepared as follows.

AM resin (9.41 g, containing 5 mmol active reaction site —$NH_2$, with a degree of substitution of 0.53 mmol/g) was weighed and put in a jacketed glass reaction vessel, to which 100 ml DCM was added to allow swelling for 2 hours, followed by suction filtration and washing with a 5% (v/v) DIEA solution in DCM twice and with DMF twice. Then the compound of Formula (A-3) of Example 3 (3.67 g, 10 mmol) and HoBt (1.35 g, 10 mmol) were added and dissolved with an appropriate amount of DMF, then DIC (1.58 ml, 10 mmol) was added, followed by a reaction in a jacketed reactor with circulating water at 30° C. for 2.5 hours. The reaction end point was separately detected with a Ninhydrin solution and a tetrachlorobenzoquinone solution, and negative results given by both solutions indicated completion of the reaction. After completion of the reaction, the Fmoc protecting group was removed with about 40 ml deprotection solution B and then with about 40 ml deprotection solution A for 30 min, wherein deprotection solution A was 10 mol % 2,6-dimethyl pyridine in DCM (2.5% 2,6-dimethyl pyridine in DCM (v/v)) and deprotection solution B was 10 mol % TBSOTf in DCM (5% TBSOTf in DCM (v/v)). After removal of Fmoc, the following amino acids protected by protecting groups were successively coupled by the SPPS method: Fmoc-Pro-OH, Fmoc-Arg (pbe-OH, Fmoc-Leu-OH, Fmoc-DLeu-OH, Fmoc-Tyr(t-Bu)-OH, Fmoc-Ser(t-Bu)-OH, Fmoc-Trp(Boc)-OH, Fmoc-His(Trt)-OH, and H-Glp-OH.

For each coupling of an amino acid, HoBt+DIC was used as the coupling reagent, and the molar ratio of active reaction sites on the polypeptide-resin:the amino acids to be coupled:the coupling reagent was 1:3:3. Each coupling needed pre-activation of the amino acid to be coupled in an ice-water bath for about 15 minutes, that is, before connection, the coupling reagent was added to react with the amino acids to be coupled.

The Fmoc protecting group was removed with a 20% (v/v) piperidine solution in DMF for 30 min.

The fully protected Leuprorelin peptide-resin thus prepared is shown below:

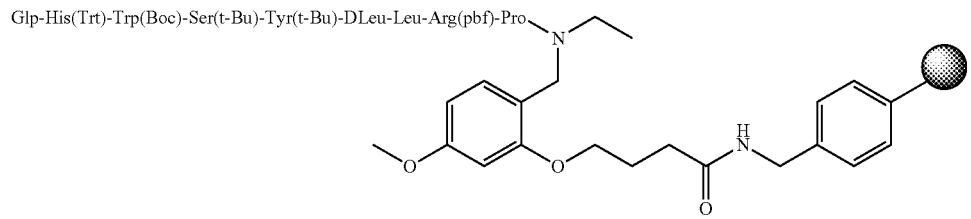

Glp-His(Trt)-Trp(Boc)-Ser(t-Bu)-Tyr(t-Bu)-DLeu-Leu-Arg(pbf)-Pro-

After drying, the obtained fully protected Leuprorelin peptide-resin was 19.26 g.

The crude peptide Leuprorelin trifluoroacetate was prepared as follows.

A 150 ml cleaving solution containing 135 ml trifluoroacetic acid, 7.5 ml EDT (1,2-ethanedithiol) and 7.5 ml pure water was prepared, shaken well, and cooled at −20° C. for 30 min for further use.

The 19.26 g fully protected Leuprorelin peptide resin obtained above (pre-cooled at −20° C. for 30 min) was put into a round-bottom flask equipped with a magnetic stirrer. 135 ml of the pre-cooled cleaving solution was shaken well and then added into the flask. The cleaving temperature was increased to 30° C. over 30 min, and maintained at 30±2° C. for 2.5 hours under stirring, followed by filtration with a sand core funnel. The resin was washed with a small amount of the cleaving solution. The combined filtrate was slowly introduced into 810 ml cold methyl tert-butyl ether (pre-cooled at −20° C. for 2 hours), during which the methyl tert-butyl ether should be stirred at a constant rate. White precipitate was formed and filtered with a Buchner funnel. The filter cake was washed with cold methyl tert-butyl ether three times, and vacuum-dried to obtain 5.46 g crude peptide Leuprorelin trifluoroacetate (yield of the crude peptide: 85.6% as calculated with respect to 5 mmol active reaction site —NH₂ on the starting resin), the purity of the crude product: 94.84%.

The crude peptide Leuprorelin trifluoroacetate was purified as follows:

The crude peptide Leuprorelin trifluoroacetate prepared above was dissolved with an aqueous solution of 5% acetonitrile, and filtered through a 0.45 μm microporous filter membrane for further use.

The reverse preparative chromatography purification was performed under the following conditions: chromatography column stationary phase: C18 octadecyl silane having a particle size of 10 μm and a pore size of 300 Å; mobile phases: 0.1% TFA aqueous solution (mobile phase A) and 0.1% TFA acetonitrile solution (mobile phase B).

| Sample solution (%) | Mobile phase A (%) | Mobile phase B (%) | Time (min) | Flow rate (ml/min) |
|---|---|---|---|---|
| 100 | 0 | 0 | / | 60 |
| 0 | 71 | 29 | 5 | 60 |
| 0 | 51 | 49 | 60 | 60 |
| 0 | 0 | 100 | 5 | 60 |

The samples with purity>97% were collected and purified with a 0.5% acetic acid aqueous solution (mobile phase C) and a 0.5% acetic acid acetonitrile solution (mobile phase D) in the following gradient:

| Sample solution (%) | Mobile phase C (%) | Mobile phase D (%) | Time (min) | Flow rate (ml/min) |
|---|---|---|---|---|
| 100 | 0 | 0 | / | 60 |
| 0 | 83 | 17 | 5 | 60 |
| 0 | 53 | 47 | 60 | 60 |
| 0 | 0 | 100 | 5 | 60 |

According to this scheme, a solution of Leuprorelin acetate in acetonitrile/water was obtained, and then subjected to rotary evaporation and lyophilization to give 2.02 g Leuprorelin acetate as a final product (total yield: 33.4% as calculated with respect to 5 mmol active reaction site —NH₂ on the starting resin; after assay according to EP8.0 (European Pharmacopoeia 8.0), the purity was 99.67% and any individual impurity was less than 0.15%), MW: 1209.41, ESI-MS, Pos [M+H]⁺=1210.5.

Example 10 Preparation of Leuprorelin Acetate

Fully protected Leuprorelin peptide-resin was prepared as follows.

AM resin (9.41 g, containing 5 mmol active reaction site —NH₂, with a degree of substitution of 0.53 mmol/g) was weighed and put in a jacketed glass reaction vessel, to which 100 ml DCM was added to allow swelling for 2 hours, followed by suction filtration, washing with a 5% (v/v) DIEA solution in DCM twice and with DMF twice. Then 4.76 g (10 mmol) of the compound prepared in Example 4

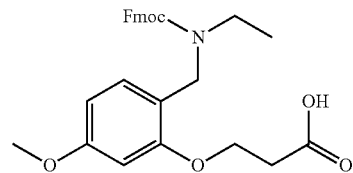

and HoBt (1.35 g, 10 mmol) were added and dissolved with an appropriate amount of DMF, and then DIC (1.58 ml, 10 mmol) was added, followed by a reaction in a jacketed reactor with circulating water at 30° C. for 2.5 hours. The reaction end point was separately detected with a Ninhydrin solution and a tetrachlorobenzoquinone solution, and negative results given by both solutions indicated completion of the reaction. After completion of the reaction, the Fmoc protecting group was removed with a 20% (v/v) piperidine solution in DMF for 30 min. After removal of Fmoc, the following amino acids protected by protecting groups were successively coupled by the SPPS method: Fmoc-Pro-OH, Fmoc-Arg(pbf)-OH, Fmoc-Leu-OH, Fmoc-DLeu-OH, Fmoc-Tyr(t-Bu)-OH, Fmoc-Ser(t-Bu)-OH, Fmoc-Trp(Boc)-OH, Fmoc-His(Trt)-OH, and H-Glp-OH.

For each coupling of an amino acid, HoBt+DIC was used as the coupling reagent, and the molar ratio of active reaction sites on the polypeptide-resin:the amino acids to be coupled:the coupling reagent was 1:3:3. Each coupling needed pre-activation of the amino acid to be coupled in an ice-water bath for about 15 minutes, that is, before connection, the coupling reagent was added to react with the amino acids to be coupled.

During the coupling, the Fmoc protecting group was removed with a 20% (v/v) piperidine solution in DMF for 30 min.

The fully protected Leuprorelin peptide-resin thus prepared is shown below:

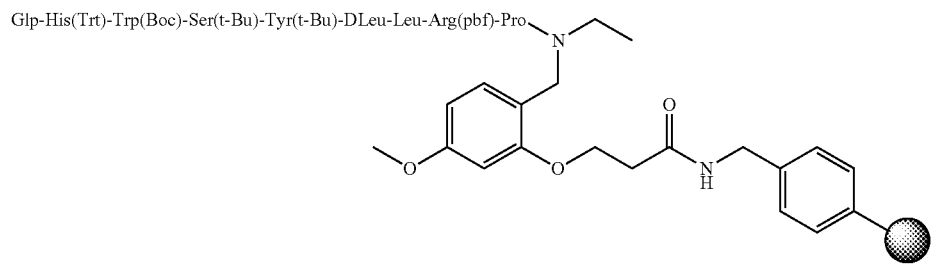

After drying, the obtained fully protected Leuprorelin peptide-resin was 20.95 g.

The crude peptide Leuprorelin trifluoroacetate was prepared as follows.

A 150 ml cleaving solution containing 135 ml trifluoroacetic acid, 7.5 ml EDT (1,2-ethanedithiol) and 7.5 ml pure water was prepared, shaken well, and cooled at −20° C. for 30 min for further use.

The 20.95 g fully protected Leuprorelin peptide resin obtained above (pre-cooled at −20° C. for 30 min) was put into a round-bottom flask equipped with a magnetic stirrer. 135 ml of the pre-cooled cleaving solution was shaken well and then added into the flask. The cleaving temperature was increased to 30° C. over 30 min, and maintained at 30±2° C. for 2.5 hours under stirring, followed by filtration with a sand core funnel. The resin was washed with a small amount of the cleaving solution. The combined filtrate was slowly introduced into 900 ml cold methyl tert-butyl ether (pre-cooled at −20° C. for 2 hours), during which the methyl tert-butyl ether should be stirred at a constant rate. White precipitate was formed and filtered with a Buchner funnel. The filter cake was washed with cold methyl tert-butyl ether three times, and vacuum-dried to obtain 5.71 g crude peptide Leuprorelin trifluoroacetate (yield of the crude peptide: 90.5% as calculated with respect to 5 mmol active reaction site —$NH_2$ on the starting resin), the purity of the crude product: 95.79%.

The crude peptide Leuprorelin trifluoroacetate was purified as follows:

The crude peptide Leuprorelin trifluoroacetate prepared above was dissolved with an aqueous solution of 5% acetonitrile, and filtered through a 0.45 μm microporous filter membrane for further use.

The reverse preparative chromatography purification was performed under the following conditions: chromatography column stationary phase: C18 octadecyl silane having a particle size of 10 μm and a pore size of 300 Å; mobile phases: 0.1% TFA aqueous solution (mobile phase A) and 0.1% TFA acetonitrile solution (mobile phase B).

| Sample solution (%) | Mobile phase A (%) | Mobile phase B (%) | Time (min) | Flow rate (ml/min) |
|---|---|---|---|---|
| 100 | 0 | 0 | / | 60 |
| 0 | 71 | 29 | 5 | 60 |
| 0 | 51 | 49 | 60 | 60 |
| 0 | 0 | 100 | 5 | 60 |

The samples with purity>97% were collected and purified with a 0.5% acetic acid aqueous solution (mobile phase C) and a 0.5% acetic acid acetonitrile solution (mobile phase D) in the following gradient:

| Sample solution (%) | Mobile phase C (%) | Mobile phase D (%) | Time (min) | Flow rate (ml/min) |
|---|---|---|---|---|
| 100 | 0 | 0 | / | 60 |
| 0 | 83 | 17 | 5 | 60 |
| 0 | 53 | 47 | 60 | 60 |
| 0 | 0 | 100 | 5 | 60 |

According to this scheme, a solution of Leuprorelin acetate in acetonitrile/water was obtained, and then subjected to rotary evaporation and lyophilization to give 2.35 g Leuprorelin acetate as a final product (total yield: 38.8% as calculated with respect to 5 mmol active reaction site —$NH_2$ on the starting resin; after assay according to EP8.0 (European Pharmacopoeia 8.0), the purity was 99.79% and any individual impurity was less than 0.15%), MW: 1209.41, ESI-MS, Pos $[M+H]^+$=1210.4.

Example 11 Preparation of Alarelin Acetate

Alarelin was prepared by the following route in this Example:

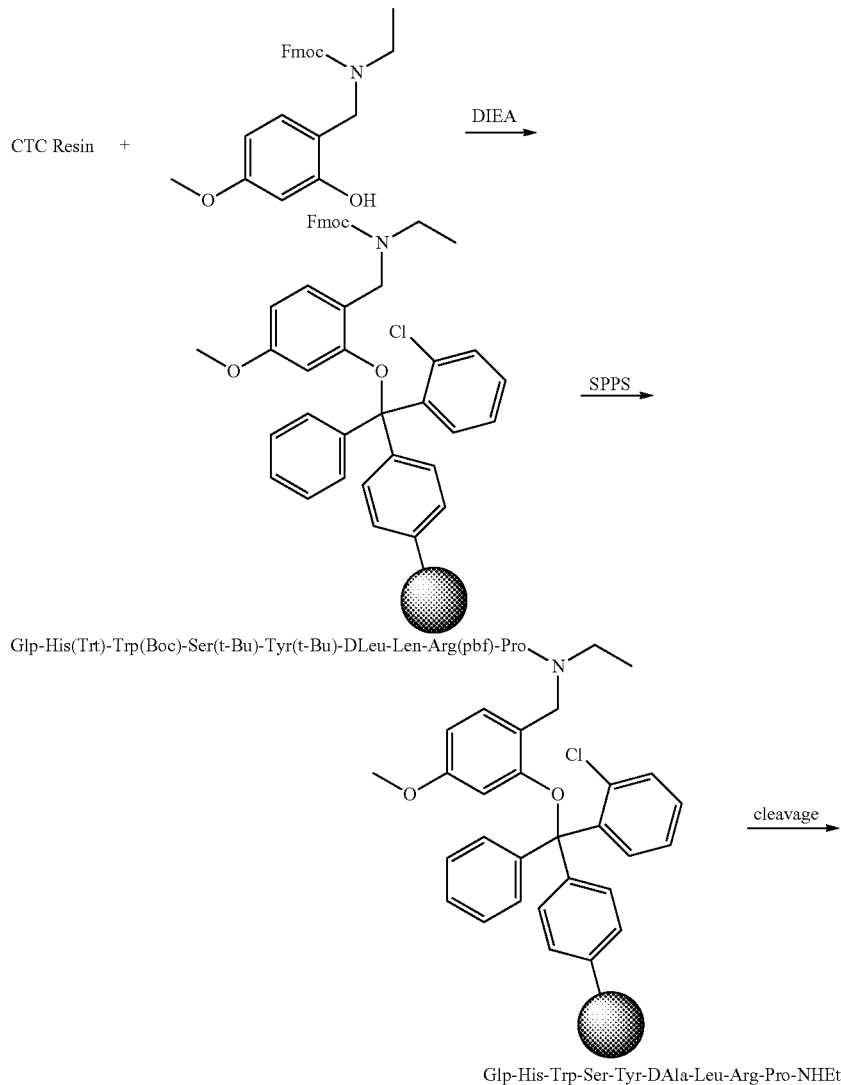

Fully protected Alarelin peptide-resin was prepared as follows.

CTC resin (30 g, containing 36 mmol active reaction site tertiary carbon Cl, with a degree of substitution of 1.2 mmol/g) and the compound of Formula (viii) (14.5 g, 36 mmol, 1 eq) were weighed and put in a jacketed glass reaction vessel, to which 300 ml DCM was added, followed by bubbling with nitrogen and addition of DIEA (25 ml, 144 mmol, 4 eq). A reaction was allowed to proceed in a jacketed reactor with circulating water at 30° C. for 2.5 hours, and the product was then endcapped with methanol for 30 min, followed by washing three times with DMF×3 and MeOH×3 and vacuum-drying, to obtain the resin with a degree of substitution of 0.35 mmol/g.

The above resin with the attached compound of Formula (viii) (14.28 g, containing 5 mmol active reaction site N-Fmoc, with a degree of substitution of 0.35 mmol/g) was added to a jacketed glass reaction vessel, to which 150 ml DCM was added to allow swelling for 120 min. The Fmoc group was removed with a 20% piperidine solution for 30 min. After removal of Fmoc, the following amino acids protected by protecting groups were successively coupled by the SPPS method: Fmoc-Pro-OH, Fmoc-Arg(pbe-OH, Fmoc-Leu-OH, Fmoc-DAla-OH, Fmoc-Tyr(t-Bu)-OH, Fmoc-Ser(t-Bu)-OH, Fmoc-Trp(Boc)-OH, Fmoc-His(Trt)-OH, H-Glp-OH.

For each coupling of an amino acid, HoBt+DIC was used as the coupling reagent, and the molar ratio of active reaction sites on the polypeptide-resin:the amino acids to be coupled:the coupling reagent was 1:3:3. Each coupling needed pre-activation of the reaction solution in an ice-water bath for about 15 minutes before connection. During the coupling, the Fmoc protecting group was removed with a 20% (v/v) piperidine solution for 30 min.

The fully protected Alarelin peptide-resin thus prepared is shown below

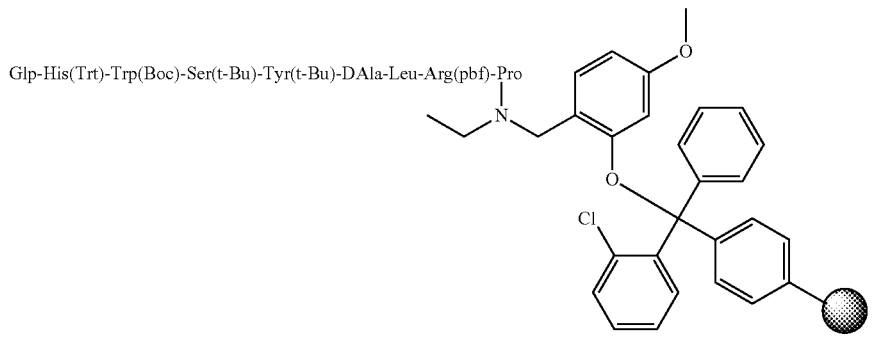

After drying, the obtained fully protected Alarelin peptide-resin was 90.3 g.

The crude peptide Alarelin trifluoroacetate was prepared as follows.

A 200 ml cleaving solution containing 180 ml trifluoroacetic acid, 10 ml EDT (1,2-ethanedithiol) and 10 ml pure water was prepared, shaken well, and cooled at −20° C. for 30 min for further use.

30.1 g of the fully protected Alarelin peptide-resin obtained above (pre-cooled at −20° C. for 30 min) was put into a round-bottom flask equipped with a magnetic stirrer. 180 ml of the pre-cooled cleaving solution was shaken well and then added into the flask. The cleaving temperature was increased to 30° C. over 30 min, and maintained at 30±2° C. for 2.5 hours under stirring, followed by filtration with a sand core funnel. The resin was washed with a small amount of the cleaving solution. The combined filtrate was slowly introduced into 1000 ml cold methyl tert-butyl ether (pre-cooled at −20° C. for 2 hours), during which the methyl tert-butyl ether should be stirred at a constant rate. White precipitate was formed and filtered with a Buchner funnel. The filter cake was washed with cold methyl tert-butyl ether three times, and vacuum-dried to obtain 10.78 g crude peptide Alarelin trifluoroacetate (yield of the crude product: 88.84% as calculated with respect to 5 mmol active reaction site N-Fmoc on the starting resin with the attached compound of Formula (viii)), the purity of the crude product: 96.14% according to the EP (8.0) method described above.

The crude peptide Alarelin trifluoroacetate was purified as follows:

The crude peptide Alarelin trifluoroacetate prepared above was dissolved with an aqueous solution of 5% acetonitrile, and filtered through a 0.45 μm microporous filter membrane for further use.

The reverse preparative chromatography purification was performed under the following conditions: chromatography column stationary phase: C18 octadecyl silane having a particle size of 10 μm and a pore size of 300 Å; mobile phases: 0.1% TFA aqueous solution (mobile phase A) and 0.1% TFA acetonitrile solution (mobile phase B).

| Sample solution (%) | Mobile phase A (%) | Mobile phase B (%) | Time (min) | Flow rate (ml/min) |
|---|---|---|---|---|
| 100 | 0 | 0 | / | 60 |
| 0 | 79 | 21 | 5 | 60 |
| 0 | 79 | 21 | 60 | 60 |
| 0 | 49 | 51 | | 60 |
| 0 | 0 | 100 | 5 | 60 |

The samples with purity>97% were collected and purified with a 0.5% acetic acid aqueous solution (mobile phase C) and a 0.5% acetic acid acetonitrile solution (mobile phase D) in the following gradient:

| Sample solution (%) | Mobile phase C (%) | Mobile phase D (%) | Time (min) | Flow rate (ml/min) |
|---|---|---|---|---|
| 100 | 0 | 0 | / | 60 |
| 0 | 87 | 13 | 5 | 60 |
| 0 | 87 | 13 | 60 | 60 |
| 0 | 57 | 43 | | 60 |
| 0 | 0 | 100 | 5 | 60 |

According to this scheme, a solution of Alarelin acetate in acetonitrile/water was obtained, and then subjected to rotary evaporation and lyophilization to give 4.16 g Alarelin acetate as a final product (total yield: 35.5% as calculated with respect to 5 mmol active reaction site N-Fmoc on the starting resin with the attached compound of Formula (viii); after assay according to EP8.0 (European Pharmacopoeia 8.0), the purity was 99.76% and any individual impurity was less than 0.15%). MW: 1167.34, ESI-MS, Pos [M+H]$^+$=1168.4.

Example 12 Preparation of PMX-53
PMX-53 was prepared by the following route in this Example
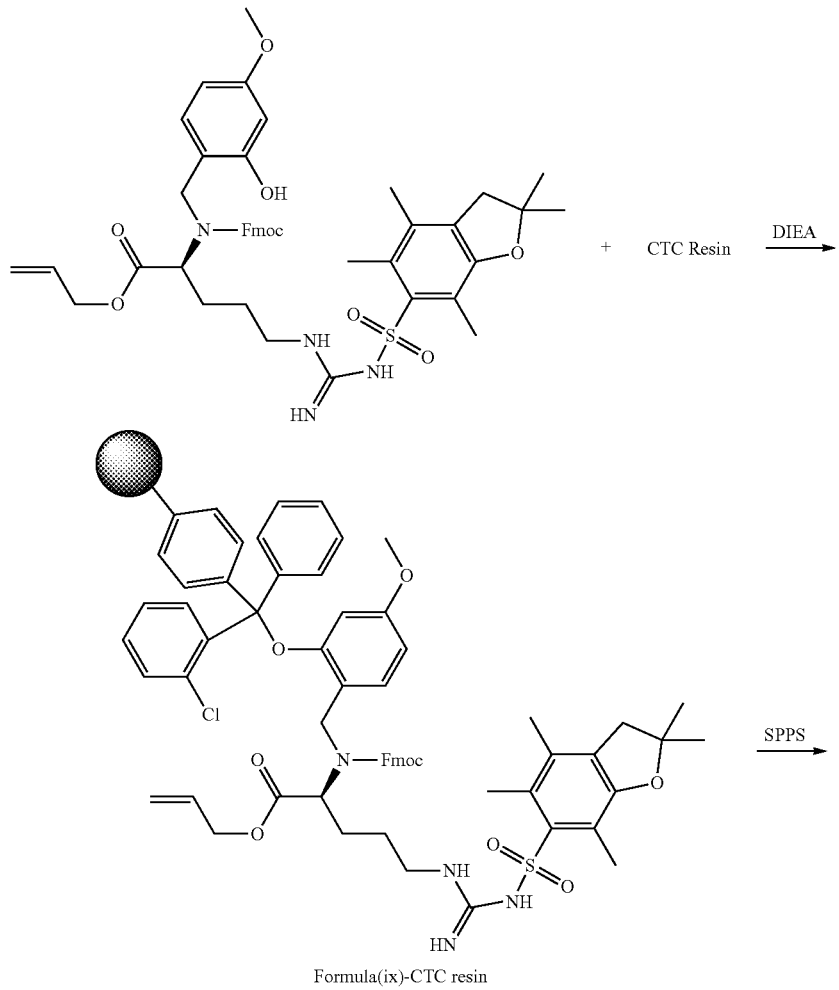
Formula(ix)-CTC resin
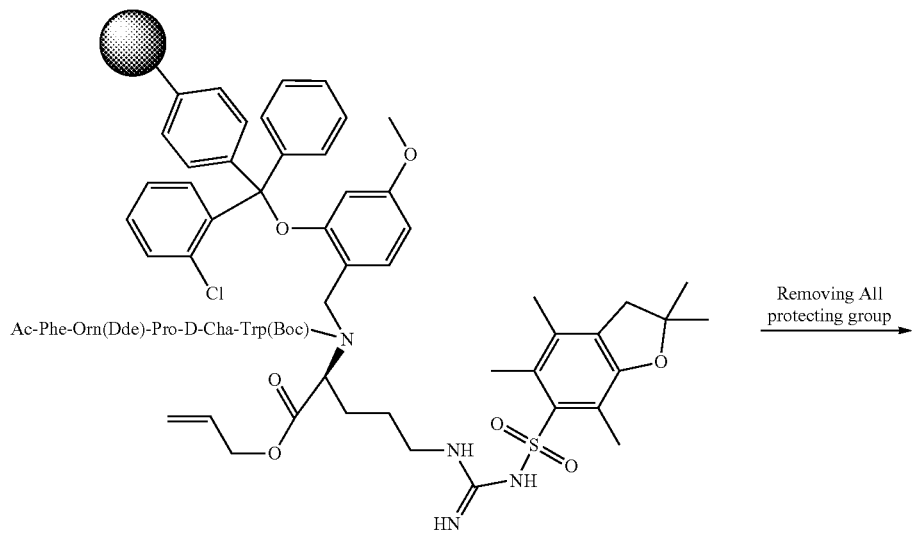

-continued

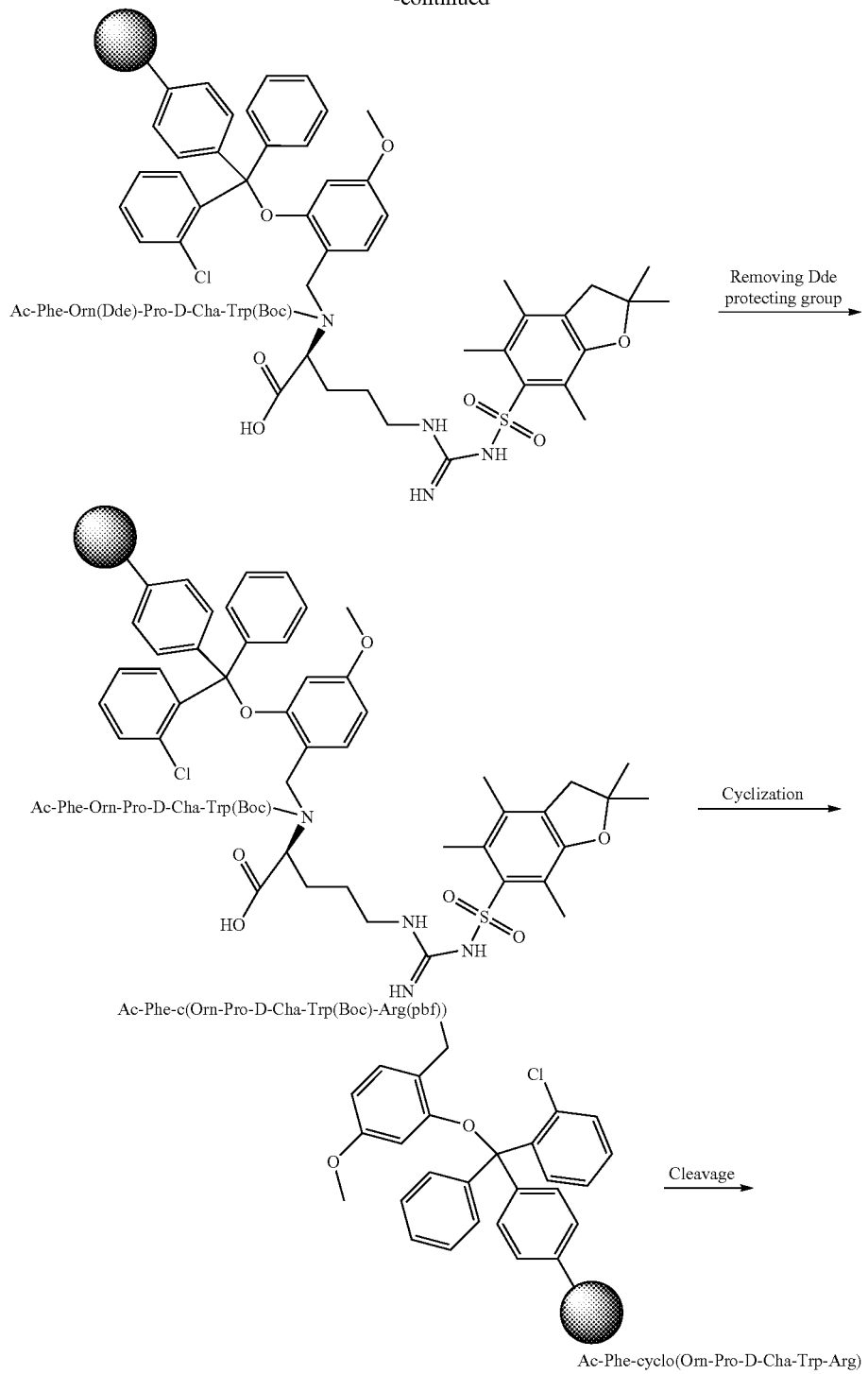

Preparation of the Formula (ix)-CTC Resin:

10 g of CTC resin (containing 10 mmol active reaction site tertiary carbon Cl, with a degree of substitution of 1.0 mmol/g, 1 eq) was weighed and added into a 250 mL dry flask, to which the compound of Formula (ix) (12.36 g, 15 mmol, 1.5 eq) and 100 mL anhydrous DCM were added. The flask was shaken on a shaking table for 10 min, followed by slow addition of DIEA (7 mL, 40 mmol, 4 eq) under shaking. After the addition of DIEA, a reaction was allowed to proceed on the shaking table at room temperature for 12.5 hours. 10 ml MeOH was further added, followed by reaction on the shaking table for 30 min. The mixture solution was transferred into a sand core reactor, washed with DMF and MeOH for three times each, vacuum-dried for 30 min, and then transferred into a dry oven at 30° C. and vacuum-dried for 16 hours to obtain 13.2 g of Formula (ix)-CTC resin, with a degree of substitution of 0.36 mmol/g as determined by UV spectrophotometer.

Fully protected PMX-53 linear peptide-resin was prepared as follows.

Formula (ix)-CTC resin (2.78 g, containing 1 mmol active reaction site N-Fmoc, with a degree of substitution of 0.36 mmol/g) was weighed and added to a jacketed glass reaction vessel, to which 30 ml DCM was added to allow swelling for 60 min. The Fmoc group was removed with a 20% (v/v) piperidine solution for 30 min. After removal of Fmoc, the following amino acids protected by protecting groups were successively coupled by the SPPS method: Fmoc-Trp(Boc)-OH, Fmoc-D-Cha-OH, Fmoc-Pro-OH, Fmoc-Orn(Dde)-OH, Fmoc-Phe-OH. Then acetylation with acetic anhydride was carried out.

During the coupling, the Fmoc group was removed with a 20% (v/v) piperidine solution in DMF for 30 min.

For each coupling of an amino acid, HoBt+DIC was used as the coupling reagent, and the molar ratio of active reaction sites on the polypeptide-resin:the amino acids to be coupled:the coupling reagent was 1:3:3. Each coupling needed pre-activation of the reaction solution in an ice-water bath for about 15 minutes before connection. Fully protected PMX-53 linear peptide-resin is as follows:

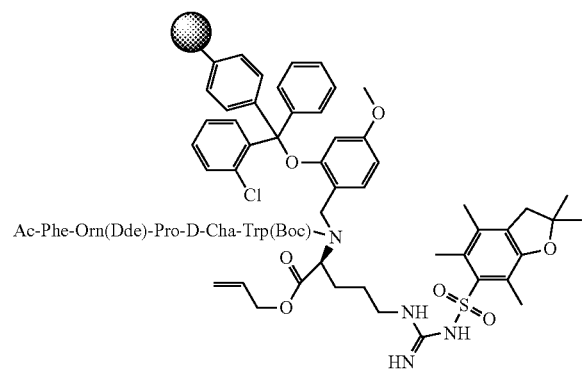

After drying, 3.70 g fully protected Alarelin peptide-resin was obtained.

Preparation of PMX-53 Cyclic Peptide-Resin:

Removal of the All protecting group: all of the above linear peptide-resin was transferred to a sand core reactor, to which 40 ml DMF was added to allow swelling for 30 min, followed by washing twice with DCM. Then 0.12 g (0.1 mmol, 0.1 eq) tetrakis(triphenylphosphine) palladium and 1.2 ml (10 mmol, 10 eq) phenylsilane were added, with 30 ml DCM as a solvent, followed by a reaction for 15 min. The above reaction was repeated three times, followed by washing five times with 0.5% DIEA/DMF and 0.5% sodium diethyldithiocarbamate/DMF, and then three times with DMF.

Removal of the Dde protecting group: a 30 ml 2.5% hydrazine hydrate/DMF solution was added to the above reactor to carry out a reaction for 1 hour, followed by washing five times with DMF.

Fully protected cyclic PMX-53 peptide-resin was prepared as follows.

To the above reactor, 25 ml DMF, 1.56 g (3 mmol, 3 eq) PyBop, and 1.05 ml (6 mmol, 6 eq) DIEA were added. After a reaction at room temperature for 60 min, a small amount of resin was taken out and washed, and tested negative in ninhydrin detection. The resultant was washed with DMF and MeOH three times each, and vacuum-dried to obtain 3.34 g fully protected cyclic peptide-resin.

PMX-53 trifluoroacetate crude peptide was prepared as follows.

Preparation of cleaving solution: a 30 ml cleaving solution containing 27 ml trifluoroacetic acid, 1.5 ml DT (1,2-ethanedithiol) and 1.5 ml pure water was prepared, shaken well and cooled at −20° C. for 30 min for further use.

3.34 g of the fulled protected cyclic peptide-resin (pre-cooled at −20° C. for 30 min) prepared as above was added to a 50 ml centrifuge tube. 24 ml of the pre-cooled cleaving solution was shaken well and then added to the centrifuge tube which was shaken on a shaking table at room temperature for 3 hours. After filtration with a sand core funnel, the resin was washed with a small amount of the cleaving solution. The combined filtrate was slowly introduced into 180 ml cold methyl tert-butyl ether (pre-cooled at −20° C. for 2 hours), during which the methyl tert-butyl ether should be stirred at a constant rate. White precipitate was formed and the supernatant was separated by centrifuge. The precipitate was washed with cold methyl tert-butyl ether three times, and vacuum-dried to obtain 0.78 g crude peptide PMX-53 trifluoroacetate (yield of the crude product: 87.3% as calculated with respect to 1 mmol active reaction site N-Fmoc on the starting resin with the attached compound of Formula (ix)), the purity of the crude product: 85.24%.

The crude peptide PMX-53 trifluoroacetate was purified as follows:

The crude peptide PMX-53 trifluoroacetate prepared above was dissolved with an aqueous solution of 5% acetonitrile, and filtered through a 0.45 μm microporous filter membrane for further use.

The reverse preparative chromatography purification was performed under the following conditions: chromatography column stationary phase: C18 octadecyl silane having a particle size of 10 μm and a pore size of 300 Å; mobile phases: 0.1% TFA aqueous solution (mobile phase A) and 0.1% TFA acetonitrile solution (mobile phase B.

| Sample solution (%) | Mobile phase A (%) | Mobile phase B (%) | Time (min) | Flow rate (ml/min) |
|---|---|---|---|---|
| 100 | 0 | 0 | / | 60 |
| 0 | 60 | 40 | 5 | 60 |
| 0 | 60 | 40 | 60 | 60 |
| 0 | 30 | 70 | | 60 |
| 0 | 0 | 100 | 5 | 60 |

According to this scheme, a solution of PMX-53 trifluoroacetate in acetonitrile/water was obtained, and then subjected to lyophilization to give 0.42 g PXM-53 final product (total yield: 46.4% as calculated with respect to 1 mmol active reaction site N-Fmoc on the starting resin with the attached compound of Formula (ix); after assay according to EP8.0 (European Pharmacopoeia 8.0), the purity was 99.12% and any individual impurity was less than 0.2%). MW=896.09 ESI, Neg: [M+H]$^+$=897.2.

Example 13 Preparation of Liraglutide Acetate

Fully protected Liraglutide peptide-resin was prepared as follows.

AM resin (1.69 g, containing 1 mmol active reaction site —NH$_2$, with a degree of substitution of 0.59 mmol/g) was weighed and put in a jacketed glass reaction vessel, to which 20 ml DCM was added to allow swelling for 2 hours, followed by suction filtration, washing with a 5% (v/v) DIEA solution in DCM twice and with DMF twice. Then the compound of Formula (x) (1.15 g, 2 mmol) and HoBt (0.27 g, 2 mmol) were added and dissolved with an appropriate amount of DMF, and then DIC (0.315 ml, 10 mmol) was added, followed by a reaction in a jacketed reactor with circulating water at 30° C. for 2.5 hours. The reaction end point was separately detected with a Ninhydrin solution and a tetrachlorobenzoquinone solution, and negative results given by both solutions indicated completion of the reaction. After completion of the reaction, the Fmoc protecting group was removed with a 20% (v/v) piperidine solution in DMF for 30 min. After removal of Fmoc, the following amino acids protected by protecting groups were successively coupled by the SPPS method: Fmoc-Arg(pbf)-OH, Fmoc-Gly-OH, Fmoc-Arg(pbf)-OH, Fmoc-Val-OH, Fmoc-Leu-OH, Fmoc-Trp(Boc)-OH, Fmoc-Ala-OH, Fmoc-Ile-OH, Fmoc-Phe-OH, Fmoc-Glu(Ot-Bu)-OH, Fmoc-Lys(N-ε-(Palm-Glu-Ot-Bu)-OH, Fmoc-Ala-OH, Fmoc-Ala-OH, Fmoc-Gln(Trt)-OH, Fmoc-Gly-OH, Fmoc-Glu(Ot-Bu)-OH, Fmoc-Leu-OH, Fmoc-Tyr(t-Bu)-OH, Fmoc-Ser(t-Bu)-OH, Fmoc-Ser(t-Bu)-OH, Fmoc-Val-OH, Fmoc-Asp(Ot-Bu)-OH, Fmoc-Ser(t-Bu)-OH, Fmoc-Thr(t-Bu)-OH, Fmoc-Thr(t-Bu)-OH, Fmoc-HmbGly-OH, Fmoc-Glu(Ot-Bu)-OH, Fmoc-Ala-OH, Boc-His(Trt)-OH.

For each coupling of an amino acid, HoBt+DIC was used as the coupling reagent, and the molar ratio of active reaction sites on the polypeptide-resin:the amino acids to be coupled:the coupling reagent was 1:3:3. Each coupling needed pre-activation of the reaction solution in an ice-water bath for about 15 minutes before connection.

During the coupling, the Fmoc protecting group was removed with a 20% (v/v) piperidine solution in DMF for 30 min.

The fully protected Liraglutide peptide-resin thus prepared is shown below:

H-His(Trt)-Ala-Glu(Ot-Bu)-HmbGly-Thr(t-Bu)-
Phe-Thr(t-Bu)-Ser(t-Bu)-
Asp(Ot-Bu)-Val-Ser(t-Bu)-Ser(t-Bu)-Try(t-Bu)-
Leu-Glu(Ot-Bu)-Gly-Gln(Trt)-
Ala-Ala-Lys(N-ε-(Palm-Glu-Ot-Bu))-
Glu(Ot-Bu)-Phe-Ile-Ala-Trp(Boc)-
Leu-Val-Arg(pbf)-Gly-Arg(pbf)

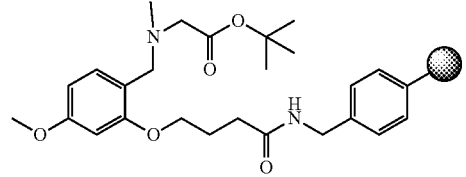

After drying, the obtained fully protected Liraglutide peptide-resin was 9.12 g.

The crude peptide Liraglutide trifluoroacetate was prepared as follows.

A 100 ml cleaving solution containing 90 ml trifluoroacetic acid, 5 ml EDT (1,2-ethanedithiol) and 5 ml pure water was prepared, shaken well, and cooled at −20° C. for 30 min for further use.

9.12 g of the fully protected Liraglutide peptide-resin obtained above (pre-cooled at −20° C. for 30 min) was put into a 250-ml round-bottom flask equipped with a magnetic stirrer. The pre-cooled cleaving solution was shaken well and then added into the flask. The cleaving temperature was increased to 30° C. over 30 min, and maintained at 30±2° C. for 2.5 hours under stirring, followed by filtration with a sand core funnel. The resin was washed with a small amount of trifluoroacetic acid. The combined filtrate was slowly introduced into 600 ml cold methyl tert-butyl ether (pre-cooled at −20° C. for 2 hours), during which the methyl tert-butyl ether should be stirred at a constant rate. White precipitate was formed and filtered with a Buchner funnel. The filter cake was washed with cold methyl tert-butyl ether three times, and vacuum-dried to obtain 3.72 g crude peptide Liraglutide trifluoroacetate (yield of the crude product: 66.9% as calculated with respect to 1 mmol active reaction site —$NH_2$ on the starting AM resin), the purity of the crude product: 67.45%.

The crude peptide Liraglutide trifluoroacetate was purified as follows:

The crude peptide Liraglutide trifluoroacetate prepared above was dissolved with an aqueous solution of 5% acetonitrile, and filtered through a 0.45 μm microporous filter membrane for further use.

The reverse preparative chromatography purification was performed under the following conditions: chromatography column stationary phase: C8 octyl silane having a particle size of 7 μm and a pore size of 300 Å; mobile phases: 0.1% TFA aqueous solution (mobile phase A) and 0.1% TFA acetonitrile solution (mobile phase B).

| Sample solution (%) | Mobile phase A (%) | Mobile phase B (%) | Time (min) | Flow rate (ml/min) |
|---|---|---|---|---|
| 100 | 0 | 0 | / | 60 |
| 0 | 46 | 54 | 5 | 60 |
| 0 | 26 | 74 | 60 | 60 |
| 0 | 0 | 100 | 5 | 60 |

The samples with purity>97% were collected and purified with a 0.5% acetic acid aqueous solution (mobile phase C) and a 0.5% acetic acid acetonitrile solution (mobile phase D) in the following gradient:

| Sample solution (%) | Mobile phase C (%) | Mobile phase D (%) | Time (min) | Flow rate (ml/min) |
|---|---|---|---|---|
| 100 | 0 | 0 | / | 60 |
| 0 | 55 | 45 | 5 | 60 |
| 0 | 5 | 95 | 60 | 60 |
| 0 | 0 | 100 | 5 | 60 |

According to this scheme, a solution of Liraglutide acetate in acetonitrile/water was obtained, and then subjected to rotary evaporation and lyophilization to give 0.68 g Liraglutide acetate as a final product (total yield: 18.1% as calculated with respect to 1 mmol active reaction site —$NH_2$ on the starting AM resin; after assay according to EP8.0 (European Pharmacopoeia 8.0), the purity was 99.21% and any individual impurity was less than 0.15%), MW: 3751.20, MODI-TOF, $[M+H]^+$=3752.4.

Finally, it should be understood that the above examples are only used to illustrate the implementation process and characteristics of the invention, but not to limit the technical solutions of the invention. Although the present invention has been described in detail with reference to the above examples, those skilled in the art should understand that the invention can be modified or replaced with equivalents, and any modifications or partial replacement without departing from the spirit and scope of the invention shall be covered in the scope of protection of the invention.

The invention claimed is:

1. A method for preparing a target polypeptide or a salt thereof, wherein the C terminal of the target polypeptide contains the —NHR$_2$ group from Formula (1), the method comprising the following steps:

attaching the compound of Formula (1) to a starting solid-phase resin to obtain Formula (1)-resin, or directly providing Formula (1)-resin;

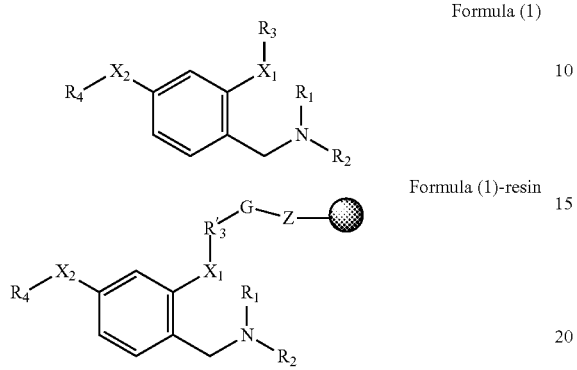

Formula (1)

Formula (1)-resin in Formula (1), R$_1$ is an amino-protecting group; wherein the amino-protecting group is Fmoc, Boc, Alloc, Dde, ivDe, Trt, Mtt or Mmt;

R$_2$ is

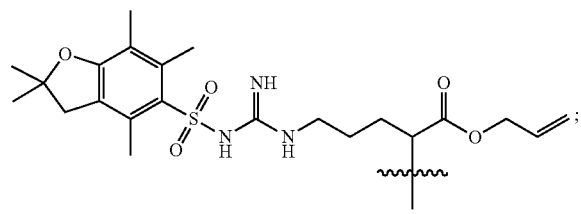 [SMILES: *C(CCCNC(=N)NS(=O)(=O)c1c(C)c(C)c2c(c1C)CC(C)(C)O2)C(=O)OCC=C]

X$_1$ and X$_2$ are each independently O;

R$_3$ is H or —(CH$_2$)$_m$COOH, m is an integer from 1 to 10, and any one or more CH$_2$ in the (CH$_2$)$_m$ may have a substituent;

R$_4$ is H or an alkyl group;

in Formula (1)-resin,

represents the body of the solid-phase resin, G is a linking structure formed by a reaction between a group in R$_3$ in Formula (1) and a group on the side chain of the solid-phase resin, R'$_3$ is the residual structure after the reaction of R$_3$, Z is the residual structure after the reaction of the side chain of the solid-phase resin, and the definitions of the other substituents are the same as those in Formula (1); R'$_3$-G-Z is R'$_3$—CONH—Z, or R'$_3$—COO—Z; alternatively, Z is directly connected to X$_1$ without R'$_3$-G;

when R$_1$ is an amino-protecting group, it is removed to expose the NH group;

preparing a peptide-resin with the peptide chain fully protected by stepwise solid-phase coupling on the exposed NH group;

cleaving the fully protected peptide chain off the peptide-resin to obtain, directly or after removing the protecting groups, the target polypeptide or a salt thereof;

optionally, before cleaving the fully protected peptide chain off the peptide-resin, using the fully protected peptide chain as a starting peptide to carryout cyclization to form a cyclic peptide;

wherein the target polypeptide is PMX-53 or a salt thereof, which is a cyclic peptide, wherein Formula (1)-resin is represented by Formula (ix)-resin;

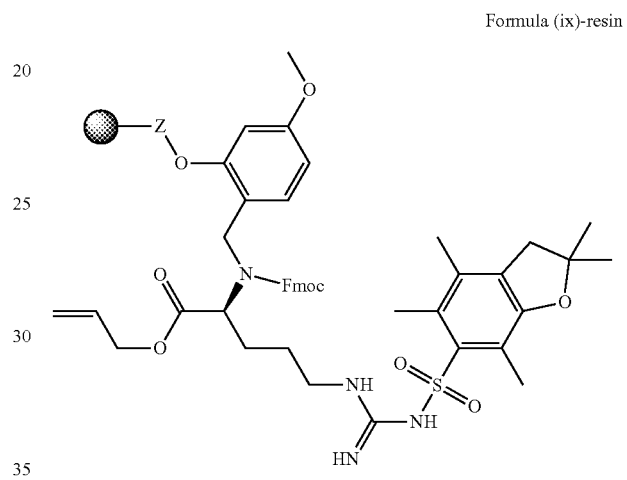

Formula (ix)-resin and the resin is a CTC resin;

wherein the peptide-resin with the uncyclized PMX-53 fully protected is prepared by successive solid-phase coupling of the amino acids Fmoc-Trp(Boc)-OH, Fmoc-D-Cha-OH, Fmoc-Pro-OH, Fmoc-Orn(Dde)-OH, and Fmoc-Phe-OH as reaction reagents to the exposed NH$_2$ group, followed by acetylation of the amino group of the last amino acid coupled, thereby obtaining the following peptide-resin with the uncyclized PMX-53 fully protected;

Ac-Phe-Orn(Dde)-Pro-D-Cha-Trp(Boc)-Formula (ix)-CTC resin;

wherein the Fmoc-protecting group attached to the peptide on the resin is removed before each coupling step;

then the All protecting group and the Dde protecting group are removed, followed by a cyclization reaction to obtain the peptide resin with PMX-53 fully protected: Ac-Phe-c(Orn-Pro-D-Cha-Trp(Boc)-Arg(pbf))-resin, wherein the resin is a CTC resin;

finally, the protecting groups are removed by cleavage to obtain PMX-53 or a salt thereof.

* * * * *